(12) United States Patent
Higashino

(10) Patent No.: US 7,545,862 B2
(45) Date of Patent: Jun. 9, 2009

(54) ADAPTIVE EQUALIZER, DECODING DEVICE, AND ERROR DETECTING DEVICE

(75) Inventor: Satoru Higashino, Tokyo (JP)

(73) Assignee: Sony Corporation, Tokyo (JP)

( * ) Notice: Subject to any disclaimer, the term of this patent is extended or adjusted under 35 U.S.C. 154(b) by 591 days.

(21) Appl. No.: 11/058,104

(22) Filed: Feb. 15, 2005

(65) Prior Publication Data

US 2005/0213652 A1  Sep. 29, 2005

(30) Foreign Application Priority Data

Feb. 16, 2004 (JP) ............................ P2004-038830

(51) Int. Cl.
*H03H 7/30* (2006.01)
(52) U.S. Cl. .................................... 375/233
(58) Field of Classification Search ................. 375/232, 375/233, 261, 262, 263, 229, 341, 230; 333/18, 333/28; 381/103; 708/323; 704/242; 714/795
See application file for complete search history.

(56) References Cited

U.S. PATENT DOCUMENTS

| | | | | |
|---|---|---|---|---|
| 5,136,593 | A * | 8/1992 | Moon et al. ................. | 714/796 |
| 5,228,058 | A * | 7/1993 | Ushirokawa et al. ........ | 375/232 |
| 5,784,415 | A | 7/1998 | Chevillat et al. | |
| 5,822,143 | A * | 10/1998 | Cloke et al. .................... | 360/65 |
| 6,617,932 | B2 * | 9/2003 | Kushner et al. ............... | 331/11 |
| 6,625,235 | B1 * | 9/2003 | Coker et al. ................. | 375/341 |
| 6,980,385 | B2 * | 12/2005 | Kato et al. ..................... | 360/39 |
| 2002/0012306 | A1 * | 1/2002 | Hayami et al. ........... | 369/59.21 |
| 2002/0150155 | A1 * | 10/2002 | Florentin et al. ............ | 375/233 |
| 2005/0019042 | A1 * | 1/2005 | Kaneda et al. ............... | 398/208 |
| 2005/0135472 | A1 * | 6/2005 | Higashino ................... | 375/233 |
| 2005/0169412 | A1 * | 8/2005 | Yang et al. ................... | 375/350 |

FOREIGN PATENT DOCUMENTS

| | | | |
|---|---|---|---|
| EP | 805448 | A2 * | 11/1997 |
| JP | 09-506747 | A | 6/1997 |
| JP | 10-051503 | A | 2/1998 |

(Continued)

OTHER PUBLICATIONS

Higashino et al., "A reduce high dimensional FDTS for magneto-optical recording", Magnetics, IEEE Transactions, vol. 33, Issue 5, part 1, Sep. 1997 pp. 3268-3270.*

(Continued)

*Primary Examiner*—Kevin M Burd
(74) *Attorney, Agent, or Firm*—Wolf, Greenfield & Sacks, P.C.

(57) ABSTRACT

For a waveform containing a partial response and distortion in only the leading-edge portion of inter-symbol interference (ISI) of a waveform equalized by a prior-stage feedforward filter (FFF) so as to satisfy causality, equalization that does not consider postcursor ISI subsequent to the partial response is performed; a feedback filter (FBF) uses a determination result of a decoding device to generate a response for the distortion of the partial response portion and the postcursor ISI; and the result is subtracted from an FFF output delayed by the amount of determination delay to create a desired partial response waveform. As a method for equalization that satisfies causality, a least mean square algorithm is applied to the partial response waveform generated as described above.

8 Claims, 19 Drawing Sheets

FOREIGN PATENT DOCUMENTS

| | | |
|---|---|---|
| JP | 2000-268502 A | 9/2000 |
| JP | 2000-276850 A | 10/2000 |
| JP | 2002-025201 A | 1/2002 |
| JP | 2005/135532 A | 5/2005 |
| JP | 2005/136624 A | 5/2005 |
| WO | WO 9711544 A1 * | 3/1997 |

OTHER PUBLICATIONS

Kavcic et al., "Correlation-sensitive adaptive sequence detection", Magnetics, IEEE Transactions, vol. 34, Issue 3, May 1998, pp. 763-771.*

Zayed et al., "Equalization and detection in nonlinear storage channels with signal-dependent noise", Digital Signal Processing Proceedings, 1997.DSP 97., 1997 13th International Conference on., vol. 2, Jul. 2-4, 1997, pp. 1027-1030.*

Carley et al, "A Low Power Analog Sampled Data VLSI Architecture for Equalization and FDTS/DF Detection", IEEE Transactions on Magnets, vol. 31 No. 2. Mar. 1995, pp. 1202-1207.*

Eleftheriou, E. and Hirt, W., "Noise-Predictive Maximum-Likelihood (NPML) Detection for the Magnetic Recording Channel," *IEEE* 1996, pp. 556-560.

Moon, J. and Carley, L. R., "Performance Comparison of Detection Methods in Magnetic Recording," *IEEE Transactions on Magnetics*, Nov. 1990, pp. 3155-3172, vol. 26, No. 6.

Schott, W., "Implementation of a Two-State Viterbi Decoder with Embedded Decision Feedback," *IEEE International Conference on Systems Engineering*, Sep. 17-19, 1992, pp. 181-184.

* cited by examiner

ADAPTIVE EQUALIZER, DECODING DEVICE, AND ERROR DETECTING DEVICE

BACKGROUND OF THE INVENTION

1. Field of the Invention

The present invention relates to an adaptive equalizer for performing partial response (PR) equalization on a waveform reproduced by an optical recording apparatus or magnetic recording apparatus, to a decoding device using the adaptive equalization, and to an error detecting device.

2. Description of the Related Art

Conventionally, an adaptive equalizer for performing adaptive equalization using a least mean square (LMS) algorithm has been known.

An FDTS/DFE, that is, a decision feedback equalizer (DFE) that uses fixed delay tree search (FDTS) as signal-determining means, is also known from Jeakyun Moon, "Performance Comparison of Detection Methods in Magnetic Recording", IEEE Transaction on Magnetics, Vol. 26, No. 6.

Noise predictive maximum likelihood (NPML), which improves detection performance by whitening noise increased during PR equalization, is also know from E. Eleftheriou, "Noise-Predictive Maximum-Likelihood (NPML) Detection for the Magnetic Recording Channel" (IEEE 1996, etc.).

However, when adaptive equalization is performed using the above-noted LMS algorithm, original data must be provisionally determined from a waveform. If data having a low signal distortion and noise ratio (SDNR) and having a large amount of distortion, such as noise and equalization error, is detected with respect to a threshold to perform the provisional determination, then the determination result contains a large amount of error to make it difficult to achieve high-speed operation with an increased adaptive gain.

This can also be true for a phase locked loop (PLL), auto gain control (AGC), and so on that require a dynamic high-speed operation. That is, detecting data having a low SDNR with respect to a threshold to obtain an error signal leads to a large amount of error, thus making it difficult to achieve high-speed operation.

Even when an attempt is made to equalize an input waveform having a small-amplitude portion or having a missing portion in a frequency range required for partial response, a frequency range that cannot be equalized remains. Such error remains as an equalization error that strongly depends on the pattern of the input data. This causes the performance of a decoding device to greatly decrease, thus leading to a decrease in bit error rate (BER).

In the above-described FDTS/DFE, a feedforward filter (FFF) needs to equalize an input waveform to a waveform that satisfies causality. If precursor inter-symbol interference (ISI), i.e., the leading-edge portion of the ISI, of a waveform equalized by the FFF remains to permit a waveform that does not satisfy causality to be input to an FDTS decoder and/or a Viterbi decoder, future-data prediction, which is a basic principle of digital signal processing, cannot be achieved. Thus, waveform distortion resulting from the precursor ISI cannot be removed. Therefore, with the FDTS decoder and the Viterbi decoder, equalization error resulting from the precursor ISI leads to an increase in error rate.

SUMMARY OF THE INVENTION

Accordingly, an object of the present invention is to provide an adaptive equalizer that is capable of performing adequate equalization processing that uses an FDTS/Viterbi decoder and so on and its results while satisfying causality and that performs adequate equalization considering distortion and ISI from a waveform output from a feedforward filter (FFF), and to provide a decoding device having such a waveform and an error detecting device.

To achieve the foregoing object, one aspect of the present invention provides an adaptive equalizer. The adaptive equalizer includes: an FFF for performing response according to a partial-response scheme on only a precursor portion of ISI of an input waveform and for performing equalization that does not consider postcursor ISI subsequent to the precursor portion; an FBF for generating a response for distortion due to the partial-response of the FFF and for the postcursor ISI; and a delay circuit for delaying the response after the equalization performed by the FFF. The response generated by the FBF is subtracted from the response delayed by the delay circuit so that a result of the subtraction provides a partial response.

The FBF generates the distortion and the postcursor ISI of the waveform equalized by the FFF.

Another aspect of the present invention provides a decoding device. The decoding device includes: an equalization circuit having an FFF for equalizing an input waveform by performing response according to a partial-response scheme and having an FBF for generating ISI subsequent to a partial response portion and distortion of a waveform equalized by the FFF from past provisional determination data; and a calculation circuit for determining the distortion of the partial response portion and the postcursor ISI based on a signal output from the equalization circuit and for performing metric calculation in which the distortion of the partial response portion and the postcursor ISI are removed from the waveform equalized by the FFF by using a past path value.

Another aspect of the present invention provides a partial equalization method. The method includes a step of performing response according to a partial-response scheme on only a precursor portion of ISI of an input waveform and for performing equalization that does not consider postcursor ISI subsequent to the precursor portion; a step of generating a response for distortion due to the partial-response and for the postcursor ISI; a step of delaying a response after the equalization; and a step of subtracting the generated response from the delayed response so that a result of the subtraction provides a partial response.

Yet another aspect of the present invention provides a decoding method. The method includes a step of performing equalization on an input waveform by performing response according to a partial response scheme; a step of generating postcursor ISI subsequent to a partial response portion and distortion of the equalized waveform, from past provisional determination data; and a step of performing metric calculation in which the partial response portion and the post ISI are determined from an output signal and the distortion of the partial response portion and a past path value is used to remove the partial response portion and the postcursor ISI from the waveform equalized in the equalization step.

According to the adaptive equalizer, the decoding device, and the method according to the present invention, equalization that does not consider postcursor ISI, which is subsequent to a partial response portion and distortion of the leading-edge portion of ISI of the waveform equalized by a feedforward filter provided at a prior stage, is performed; the FBF generates a response for the distortion and the postcursor ISI; and path-metric calculation for a path feedback structure is performed in conjunction with the post-FFF response. This can perform decoding at a lower error rate while compensating for a missing frequency portion of the input waveform.

Further, the FBF generates a response for the distortion and the postcursor ISI and the response is subtracted from the delayed response of the post-FFF response so that the result provides a partial response. The result is used to perform error correction to provide a result with a reduced influence of the distortion and the ISI.

In addition, with a provisional determination value for calculation for the error, when the error rate of the provisional determination value is unfavorable, the amount of incorrect error-detection result increases. However, when the provisional determination value provided by the present invention is used for the error detection calculation, it is possible to output an increased amount of correct error-detection result with a reduced influence of the distortion and the ISI.

DESCRIPTION OF THE PREFERRED EMBODIMENT

Figure 1:
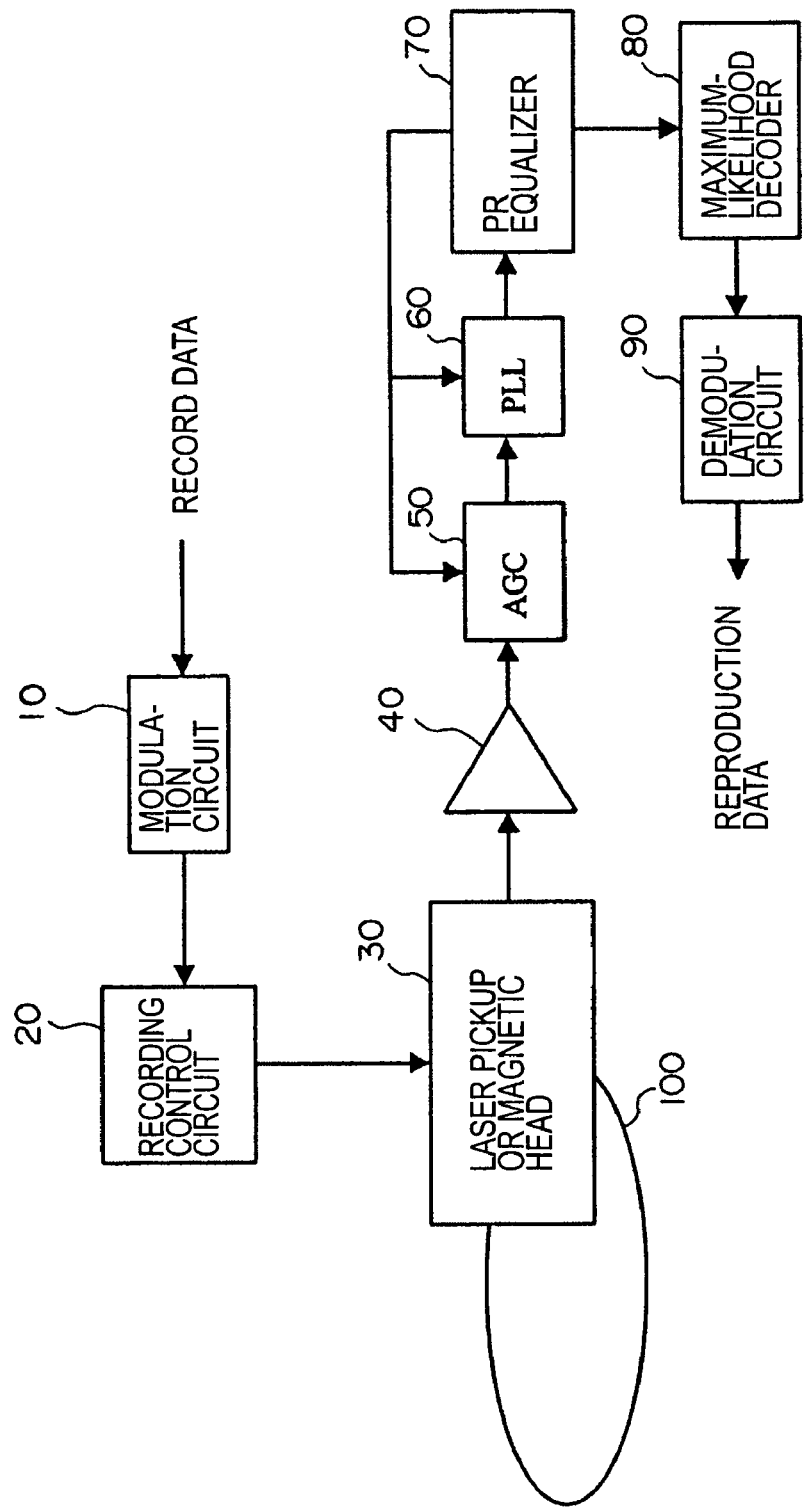
FIG. 1 is a block diagram showing a basic configuration of an optical recording device or magnetic recording device according to an embodiment of the present invention.

In an adaptive equalizer of an embodiment of the present invention, for a waveform containing a partial response and distortion in only the leading-edge portion of ISI of a waveform equalized by a prior-stage feedforward filter (FFF) so as to satisfy causality, equalization that does not consider postcursor ISI subsequent to the partial response is performed; a feedback filter (FBF) uses a determination result of a decoding device to generate a response for the distortion of the partial response portion and the postcursor ISI; and the result is subtracted from an FFF output delayed by the amount of determination delay to create a desired partial response waveform.

As a method for the FFF for performing equalization that satisfies causality, an LMS algorithm is applied to the partial-response waveform generated as described above. In addition, as a method for the FBF for creating a response for the distortion of the partial response portion and the postcursor ISI, an LMS algorithm is applied to the partial response waveform generated as described above.

In a decoding device according to the present embodiment, the FFF is arranged at a prior stage, and a path feedback structure subtracts the distortion of the partial response portion and the postcursor ISI from an output from the FFF to perform metric calculation, thereby performing FDTS decoding and Viterbi decoding. For the FDTS decoding and the Viterbi decoding in the path feedback structure, metrics are calculated using a coefficient created from FBF tap coefficients.

In the decoding device of the present embodiment, an FDTS decoder and a Viterbi decoder share a path memory for metric operation, thereby achieving the configuration with one piece of hardware. That is, it is possible to implement a system that requires determinations of both Viterbi decoding and FDTS decoding, without an increase in the number of pieces of hardware. In addition, a noise predictor is arranged subsequent to the FFF so as to allow NPML detection.

In the embodiment described below, although a description is give of an example of an adaptive equalizer and a decoding device according to the present invention, the present invention is also applicable to a calculation device for performing similar calculation and an error detection device for performing similar error detection. Such arrangements will appropriately be described in the following embodiment.

The specific embodiment of the present invention will be described below in detail with reference to the accompanying drawings.

The present embodiment provides a waveform equalizer for communication, magnetic recording, and optical recording/reproducing apparatuses. The equalizer has a configuration in which a feedforward filter (FFF) is arranged at a prior stage and a decoder having a pass feedback structure decodes an output from the FFF. For partial response and distortion only in the leading-edge portion (hereinafter referred to as "precursor ISI" of ISI of a waveform equalized by the FFF, equalization that does not consider a subsequent response (hereinafter referred to as "postcursor ISI" is performed. Metric calculation for a path feedback structure is performed to allow decoding.

In the present embodiment, a feedback filter (FBF) generates a response for the distortion of the PR portion and the postcursor ISI by using a decoding result and the result is subtracted from a post-FFF response that is delayed by the amount of determination delay, so that the result provides a partial response. The partial response can be detected through the use of an LMS algorithm, a phase error detector, and a gain error detector, with a reduced influence of the distortion.

FIG. 1 is a block diagram showing a basic configuration of an optical recording apparatus or a magnetic recording apparatus according to an embodiment of the present invention.

As shown, the apparatus of the present embodiment includes a modulation circuit 10, a recording control circuit 20 for controlling record current for a recording laser or a magnetic head in accordance with a modulation signal, a laser pickup or magnetic head 30 for recording/reproducing various types of data to/from a medium 100, a reproduction amplifier 40, an automatic gain control (AGC) 50, a phase-locked loop (PLL) 60, a partial-response (PR) equalizer 70, a maximum-likelihood decoder 80, and a demodulation circuit 90. The medium 100 may be an optical disk or a magnetic disk.

Figure 2:
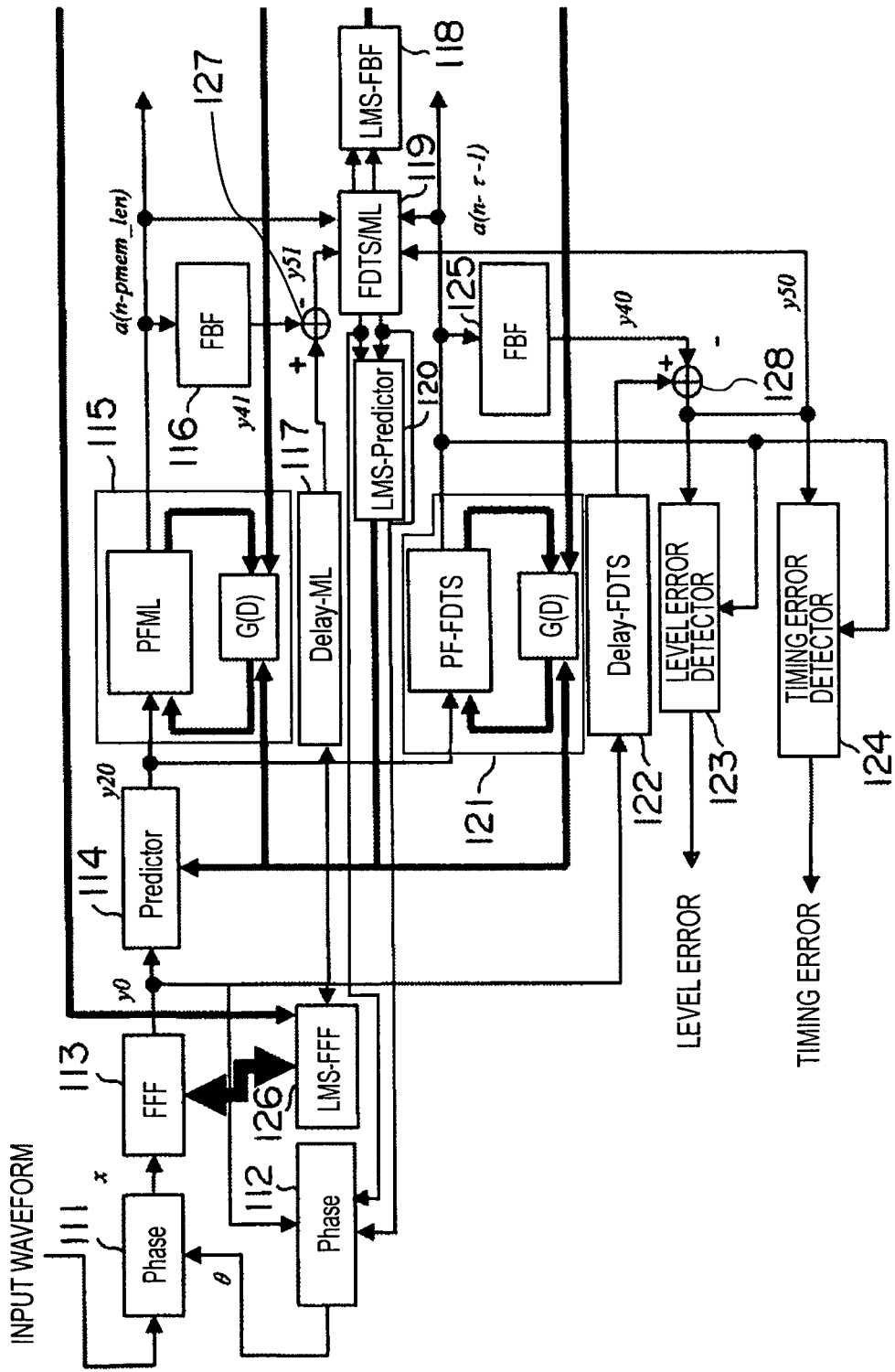
FIG. 2 is a block diagram showing PR equalizer and a maximum-likelihood decoder shown in FIG. 1.

FIG. 2 is a block diagram showing details of the PR equalizer 70 and the maximum-likelihood decoder 80 shown in FIG. 1.

The PR equalizer 70 and the maximum-likelihood decoder 80 have a complicated hybrid structure that features an operation for improving the mutual performances. The structure includes phase shifters 111 and 112, a feedforward filter (FFF) 113, a predictor 114, a Viterbi decoder (PFML) 115, feedback filters (FBFs) 116 and 125, an ML (maximum likelihood) delay device 117, a least-mean square feedback filter (LMS-FBF) 118, an FDTS/ML selection unit 119, an LMS-predictor 120, an FDTS decoder (PF-FDTS) 121, an FDTS delay device 122, a level-error detector 123, a timing-error detector 124, and an LMS-FFF 126. The Viterbi decoder 115 and the FDTS decoder 121 can share at least a portion of the circuit in actual circuit design.

Hereinafter, a description will be given in conjunction with an example of an input waveform, an equalization waveform, and so on. The example, however, is merely illustrative and is not intended to restrict the scope of the appended claims.

Figure 3:
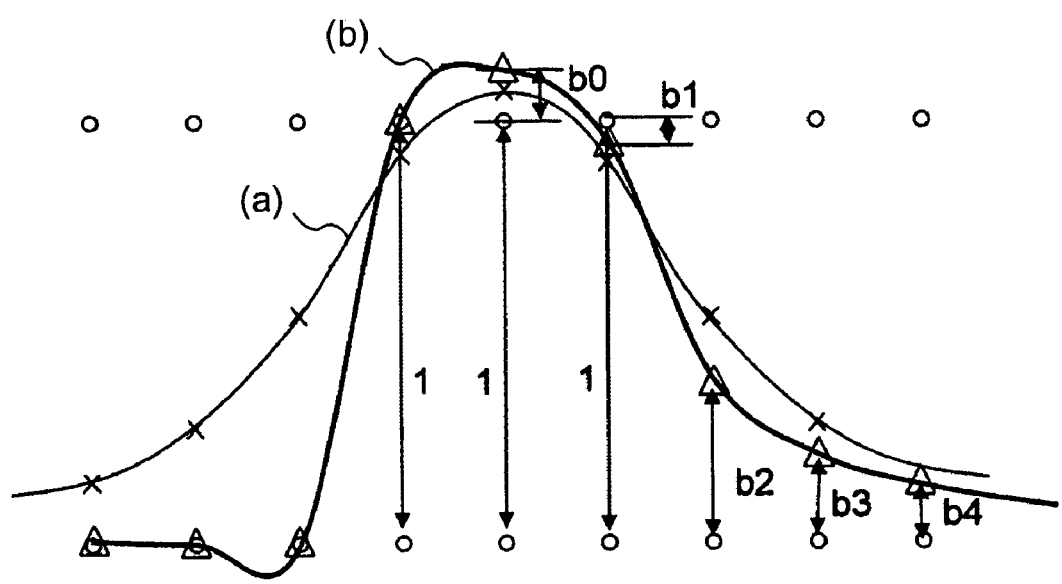
FIG. 3 is a graph showing one example on a waveform input to the FFF shown in FIG. 2.

First, a sampled read-waveform as indicated by waveform (a) in FIG. 3 is input to the FFF 113 shown in FIG. 2. When an attempt is made to equalize a waveform for initial three pieces of data to PR(111), an output having an equalization waveform as indicated by waveform (b) shown in FIG. 3 is obtained.

The equalization wave y0n is expressed by:

$$y0_n = \sum_{i=0}^{PR\_len-1} c_i \cdot a_{n-i} + \sum_{i=0}^{fbf\_len-1} b_i \cdot a_{n-1-i} + w_n \quad (1)$$

where ci indicates a generalized PR coefficient, and pr_len indicates an interference length. For example, c0=1, c1=1, and PR_len=2 are given for PR(11); c0=1, c1=2, c2=1, and PR_len=3 are given for PR(121); and c0=1, c1=1, c2=1, and PR_len=3 are given for PR(111).

Further, bi indicates distortion that is a displacement from the originally-intended PR in FIG. 3, an is a value for NRZ data recorded at time n and takes a value of ±1, and wn indicates superimposed noise.

The FFF is a digital filter for calculating the following:

$$y0_n = \sum_{i=0}^{fff\_len-1} f_i \cdot x_{n-i} \quad (2)$$

Figure 4:
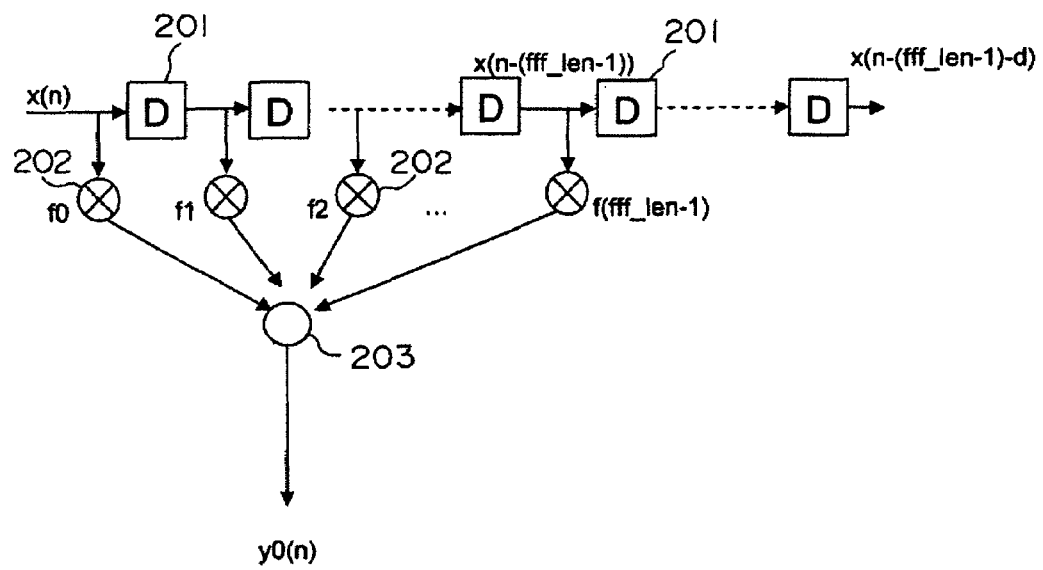
FIG. 4 is a block diagram showing an exemplary configuration of the FFF shown in FIG. 2.

As shown in FIG. 4, the FFF 113 has a structure in which delay units 201, multipliers 202, and an adder 203 are connected. A value supplied by the FFF LMS block 126 described below is set for coefficient fi (i is an integer).

With regard to the two FBFs 116 and 125 shown in FIG. 2, the FBF 125 uses a determination result of the FDTS decoder 121 and has an output indicated by y40. The FBF 116 uses an output of the Viterbi decoder 115 and has an output indicated by y41. For the FBFs 116 and 125, tap coefficients bi (i=0, 1, ..., and fbf_len−1) supplied from the FBF LMS block 118 described below are set to cancel ISI of data after the second piece of data for the equalization waveform indicated by waveform (b) shown in FIG. 3.

The FBFs 125 and 116 calculate expressions (3) and (4), respectively.

$$y40_{n-d0} = \sum_{i=0}^{fbf\_len-1} b_i \cdot \hat{a}_{n-(d0+1)-i} \quad (3)$$

$$y41_{n-d1} = \sum_{i=0}^{fbf\_len-1} b_i \cdot \hat{a}_{n-(d1+1)-i} \quad (4)$$

Figure 5:
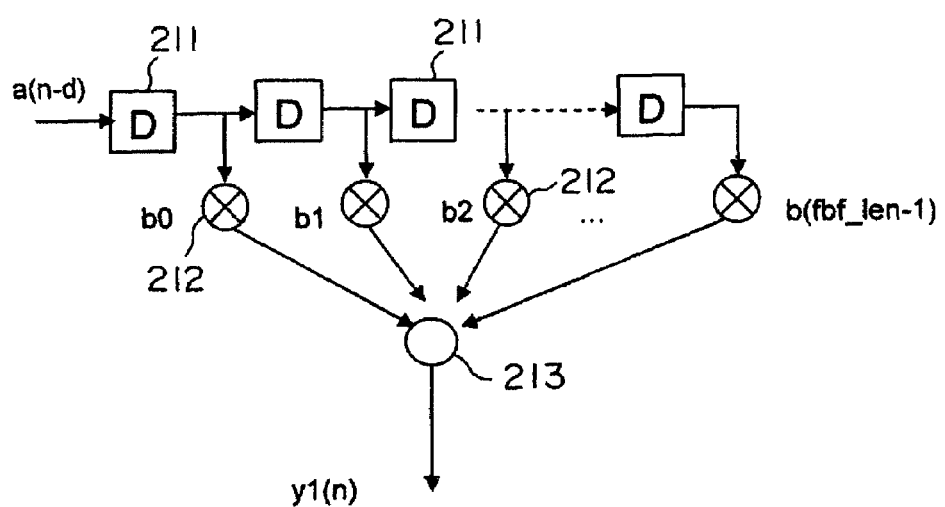
FIG. 5 is a block diagram showing an exemplary configuration of the FBF shown in FIG. 2.

The FBFs 125 and 116 have a structure in which delay units 211, multipliers 212, and an adder 213 are connected as shown in FIG. 5. In this case, d0 indicates determination delay of the FDTS decoder 121, d1 indicates determination delay of the Viterbi decoder 151, and d0 and d1 are an integer of 0 or more.

Data a(n−d0) and a(n−d1), which are determination results of the FDTS decoder 121 and the Viterbi decoder 115 and are −1 or +1, are input to the FBFs 125 and 116.

The results are subtracted, by subtractors 127 and 128, from memory outputs having a length corresponding to a determination delay of the equalization waveform (i.e., waveform (a) shown in FIG. 3) of the FFF 113, so that the equalization waveform is shaped into PR (111) waveforms. When the resulting waveform is expressed as y50(n−d0) and y51 (n−d1), the following equations are given:

$$y50_{n-d0} = \sum_{i=0}^{fff\_len-1} f_i \cdot x_{n-d0-i} - \sum_{i=0}^{fbf\_len-1} b_i \cdot \hat{a}_{n-(d0+1)-i} \quad (5)$$

$$y51_{n-d1} = \sum_{i=0}^{fff\_len-1} f_i \cdot x_{n-d1-i} - \sum_{i=0}^{fbf\_len-1} b_i \cdot \hat{a}_{n-(d1+1)-i} \quad (6)$$

The predictor 114 shown in FIG. 2 is a block for whitening noise, and prediction coefficients pk (k=1, 2, ..., and prd_len) are set therefor. A method for determining the prediction coefficients is described below. The predictor 114 is a digital filter for calculating the following:

$$y2_n = y0_n - \sum_{i=1}^{prd\_len} p_i \cdot y0_{n-i} \tag{7}$$

Figure 6:
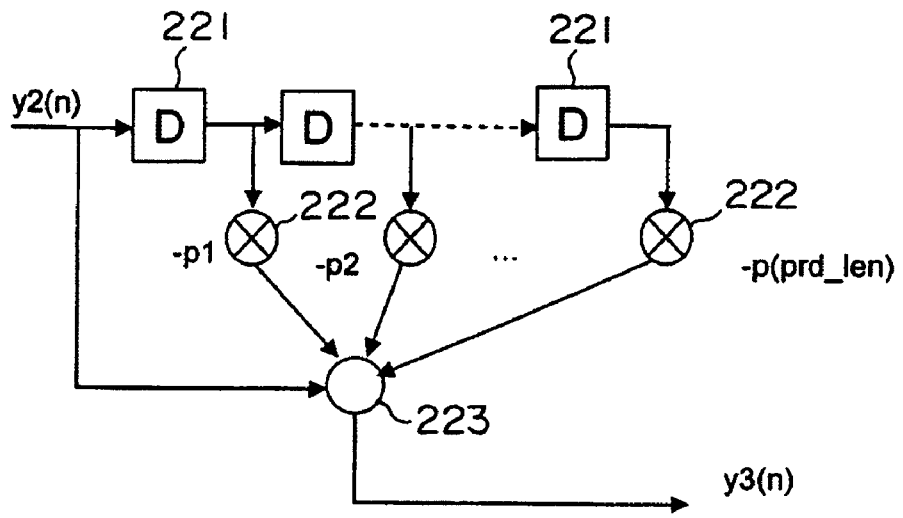
FIG. 6 is a block diagram showing an exemplary configuration of the predictor shown in FIG. 2.

As shown in FIG. 6, the predictor 114 has a structure in which delay units 221, multipliers 222, and an adder 223 are connected.

The operation of the FDTS decoder and the Viterbi decoder will now be described.

In branch metric calculation for the FDTS decoder and the Viterbi decoder, calculations according to the present invention are performed for removing distortion and precursor ISI in addition to noise prediction described in expression (5) or (7) as described in E. Eleftheriou and W. Hirt, "Noise-Predictive Maximum-Likelihood (NPML) Detection for the Magnetic Recording Channel". Herein, however, it is assumed that a minimum metric is used and the symbol of the expression is reversed. In addition, although an example of RP4 is described in that paper, the calculation herein is performed for an example of generalized PR.

The transfer function, P(D), for the predictor 114 can be expressed by:

$$P(D) = p_1 \cdot D + p_2 \cdot D^2 + \ldots + p_N \cdot D^N \tag{8}$$

The transfer function, G(D), for the Viterbi decoder 115 is defined as:

$$G(D) = (c_0 + c_1 \cdot D + c_2 \cdot D^2 \ldots c_{PR\_len-1} \cdot D^{PR\_len-1}) \cdot (1 - P(D)) \tag{9}$$

$$\equiv -g_0 - g_1 \cdot D \ldots - g_{prd\_len+PR\_len-1} \cdot D^{prd\_len+PR\_len-1}$$

This coefficient gi (g0=−c0) is calculated by a calculation block G(D) of the LMS predictor 120 described below and shown in FIG. 18.

H(D) for removing distortion and postcursor ISI, the removal being a feature of the present invention, is defined as:

$$H(D) = (b_0 \cdot D + b_1 \cdot D^2 \ldots b_{fbf\_len-1} \cdot D^{fbf\_len}) \cdot (1 - P(D)) \tag{10}$$

$$\equiv -h_0 - h_1 \cdot D \ldots - h_{prd\_len+fbf\_len} \cdot D^{prd\_len+fbf\_len}$$

This coefficient hi(h0=0) is calculated by an H(D) calculation block of the LMS-FBF 118 described below and shown in FIG. 16.

A branch metric for time n is given by:

$$\lambda_n = \left( y2_n + \sum_{i=0}^{prd\_len+PR\_len} a_{n-i} \cdot g_i + \sum_{i=0}^{prd\_len+fbf\_len} a_{n-i} \cdot h_i \right)^2 \tag{11}$$

When the branch metric for the FDTS with cut-off depth τ is considered, calculation for the following expression is performed.

$$\lambda_n = \left( y2_n + \sum_{i=\tau+1}^{prd\_len+PR\_len} \hat{a}_{n-1} \cdot g_i + \sum_{i=\tau+1}^{prd\_len+fbf\_len} \hat{a}_{n-1} \cdot h_i + \sum_{i=0}^{\tau} a_{n-1} \cdot (g_i + h_i) \right)^2 \tag{12}$$

When a constraint length for expansion into the state of the Viterbi decoder is indicated by K, calculation for the follow ing expression (13) is performed for a branch metric from state sl to state sm of the Viterbi decoder.

$$\lambda_n(s_l, s_m) = \left( y2_n + \sum_{i=K+1}^{prd\_len+PR\_len} \hat{a}_{n-i}(s_l) \cdot g_i + \sum_{i=K+1}^{prd\_len+fbf\_len} \hat{a}_{n-i}(s_l) \cdot h_i + \sum_{i=0}^{K} a_{n-i} \cdot (g_i + h_i) \right)^2 \tag{13}$$

In this case, the state number for the Viterbi decoder 115 is $2^K$.

Figure 7:
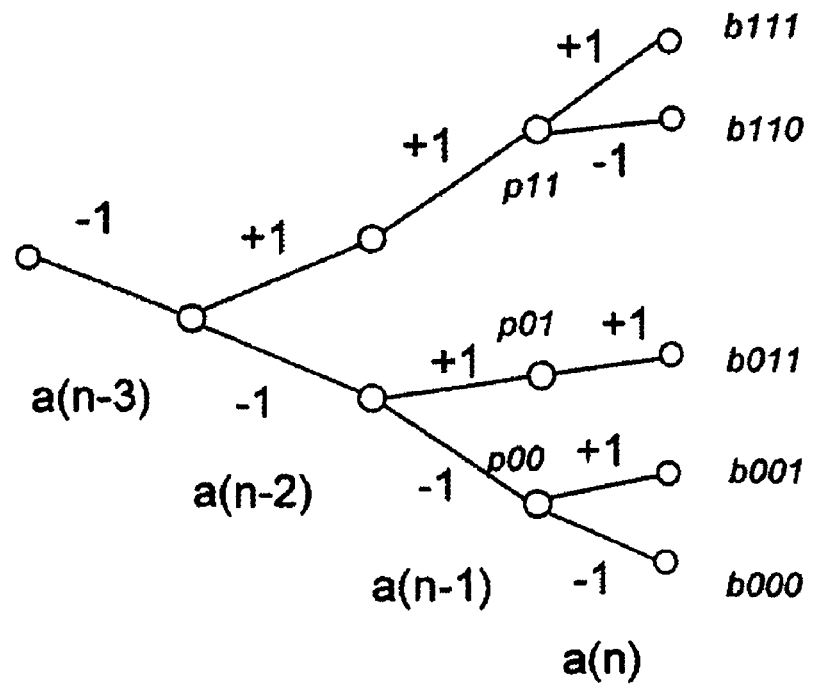
FIG. 7 shows a tree structure for a case in which the past data of a(n−3) of the FDTS decoder shown in FIG. 2 is −1.
Figure 8:
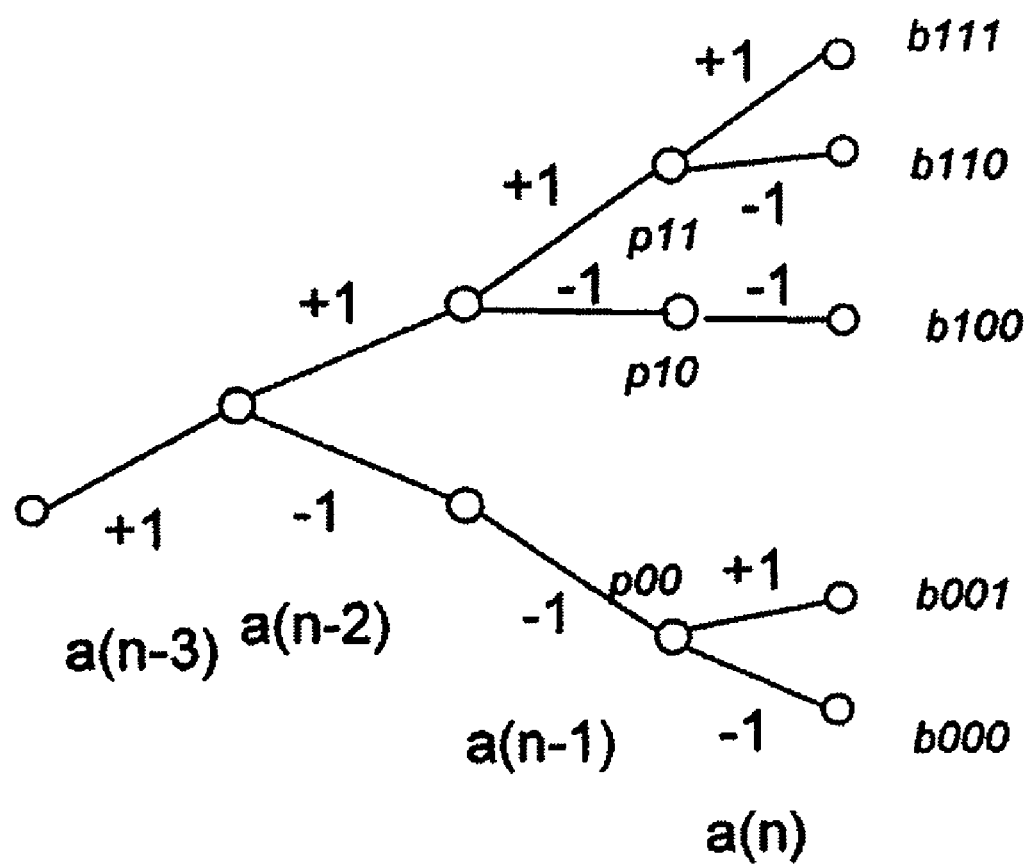
FIG. 8 shows a tree structure for a case in which the past data of a(n−3) of the FDTS decoder shown in FIG. 2 is +1.

A system in which symbol d=1 is recorded as the minimum drive length (expressed by dmin or d) for the record symbol will now be discussed. The minimum drive length refers to a minimum consecutive number of −1s or +1s for the NRZ record symbol. That is, the symbol d=1 means that the symbol −1 or +1 continues at least twice. FIG. 7 shows an FDTS tree structure for a case in which d is 1, τ is 2, and the past data of a(n−3) is −1. FIG. 8 shows an FDTS tree structure for a case in which the past data of a(n−3) is +1.

FDTS calculation is typically performed with, for example, a hardware structure as in the example of τ=1 in the decoder disclosed in Japanese Unexamined Patent Application Publication No. 2003-371112 assigned to the same assignee. A decoder circuit in the structure of a Viterbi decoder described below will now be described in order to show the shared hardware of the metric calculation units of the Viterbi decoder and the FDTS decoder, the shared hardware being a feature of the present invention.

A path-feedback Viterbi decoder for d=1 and K=2 (the state number is 4) will now be described.

Figure 9:
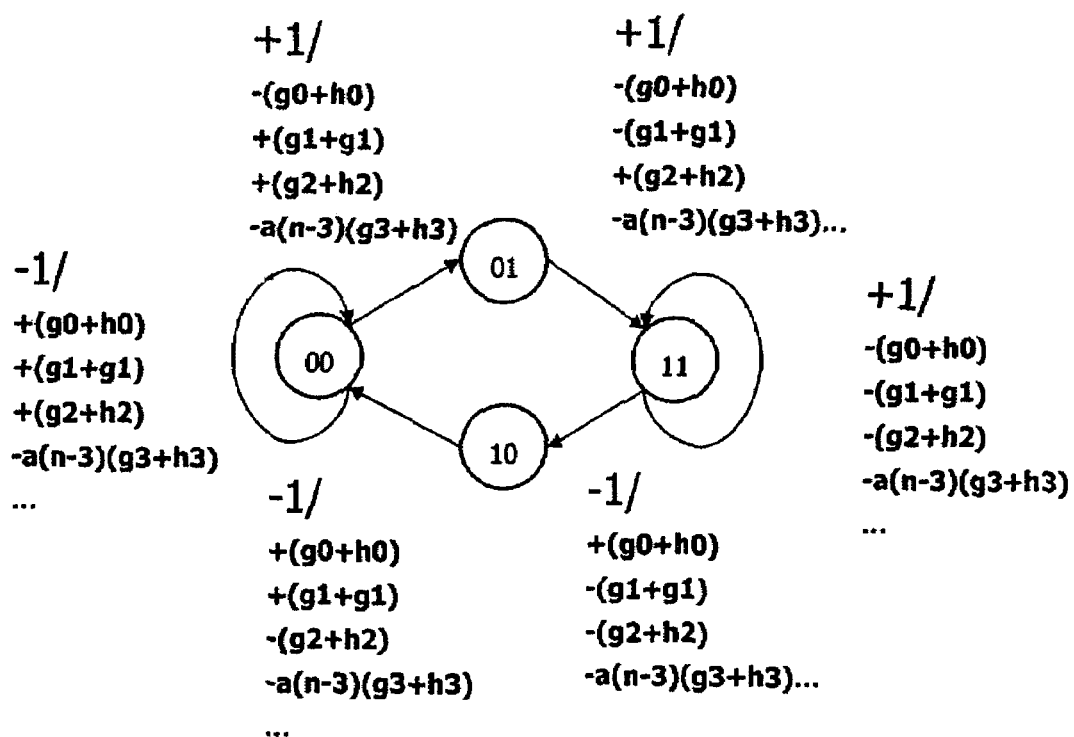
FIG. 9 illustrates state transition of the Viterbi decoder shown in FIG. 2.

FIG. 9 illustrates a state transition in this case. The state corresponds to a(n−2)a(n−1). Symbol −1, however, is indicated by "0". For example, past data having a(n−2)=−1 and a(n−1)=+1 indicates state 01. The transition lines indicate the relationship "input symbol a(n)"/"output ISI".

Figure 10:
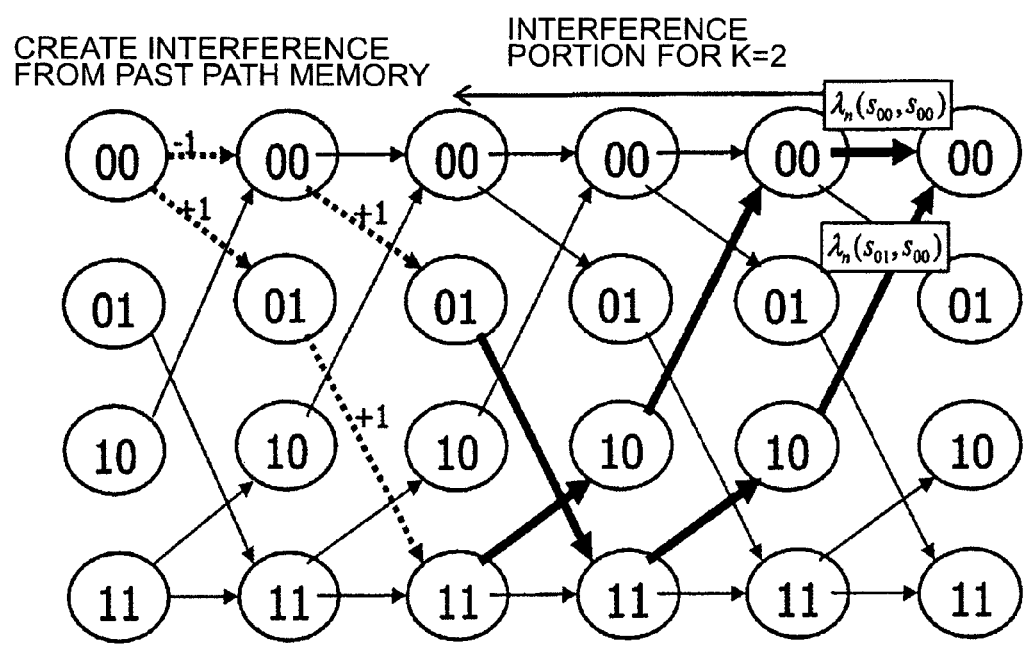
FIG. 10 is a trellis diagram showing the state transition shown in FIG. 9.

The transition state is also expressed by a trellis diagram shown in FIG. 10. For example, as shown, since the branch metric for state 00 can transit from s00 to s00 and from s01 to s00, branch metrics for the two transitions are calculated.

W. Schott, "Implementation of Two State Viterbi Decoder with Embedded Decision Feedback" describes two states for a path-feedback Viterbi decoder prototype. The Viterbi decoder of the present embodiment also has a similar structure and is further characterized in that the state transition is restricted considering that the minimum drive length and metric calculation for the path-feedback structure is performed using the values of gi and hi determined as described below.

Figure 11:
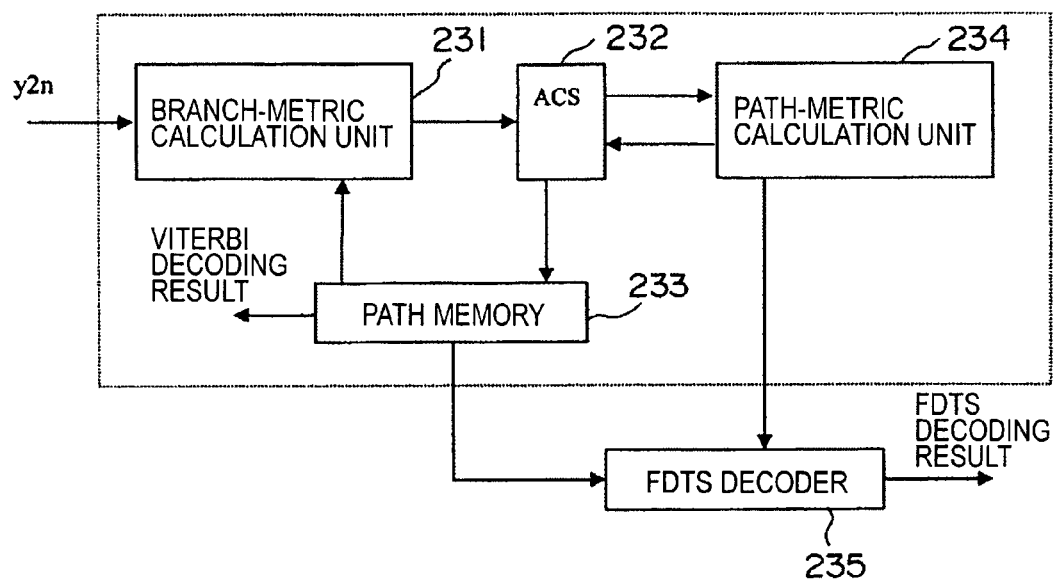
FIG. 11 is a block diagram showing the entire structure of the path-feedback Viterbi decoder and the FDTS decoder shown in FIG. 2.

FIG. 11 is an overall block diagram of the path-feedback Viterbi decoder and the FDTS decoder according to the present embodiment. As shown, this decoding device has branch-metric calculation unit 231, add compare select (ACS) units 232, path memories 233, a path-metric calculation unit 234, and an FDTS decoder 235.

The number of branch metric calculation units 231, ACS units 232, and path memories 233 corresponds to the number of Viterbi decoding states. The path metric calculation unit 234 has a function for normalizing path metrics and determining the minimum state, the number of path metrics corresponding to the number of states. As a feature of the present invention, the FDTS decoder 235 has a function for performing FDTS calculation using Viterbi decoding path metrics and branch metrics.

Figure 12:
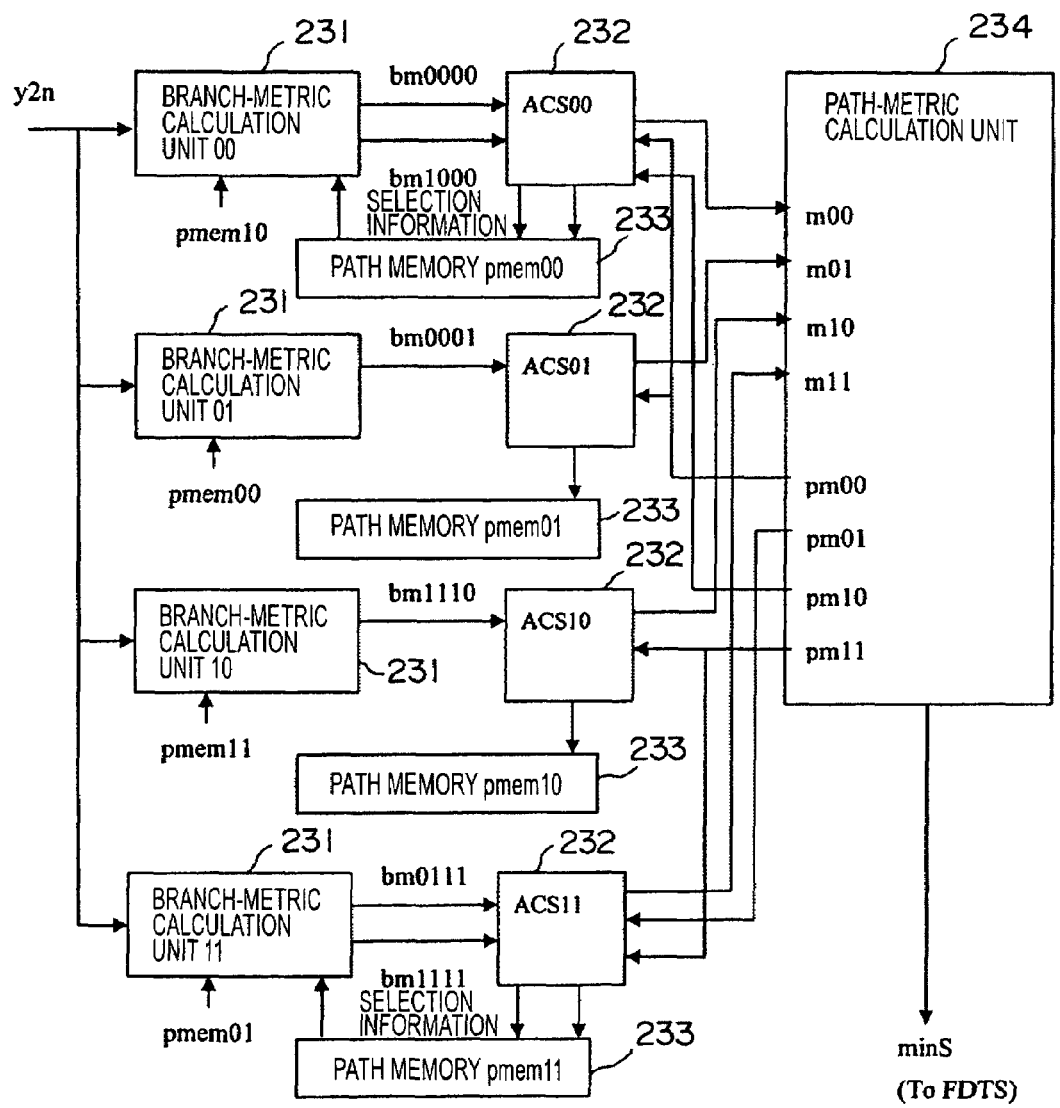
FIG. 12 is a block diagram showing details of the Viterbi decoder shown in FIG. 11.

FIG. 12 is a detailed block diagram of the Viterbi decoder for performing the state transition shown in FIGS. 9 and 10.

Referring to FIG. 12, this Viterbi decoder includes the branch metric calculation units 231, the ACS units 232, the path memories 233, and the path metric calculation unit 234, as shown in FIG. 11.

The path memories 233 include shift registers having memories according to the number of pmem_len. The shift registers are arranged in order of time. In the following description, the arrangement of individual elements of the Viterbi decoder will be expressed using a suffix that is an integer i (0 to pmem_LEN-1) corresponding to the path memories 233.

First, the branch metric calculation unit 00 calculates bm0000=λn(s00,s00) and bm1000=λn(s10,s00) by using the past values of pmem00 and pmem10. The ACS00 compares values pm00+bm0000 and pm10+bm1000, which are obtained by adding normalized path metrics to branch metrics, to select the smaller value thereof, and then outputs the value as m00. The ACS00 also outputs, to path memory pmem00[0], information indicating "−1" and a selected branch.

The branch metric calculation unit 01 calculates bm0001=λn(s00,s01) by using the past value of pmem00. The ACS01 outputs, as m01, value pm00+bm0001, which is obtained by adding a normalized path metric to a branch metric. Since only one input for this state exists, no comparison is performed. The ACS01 also outputs "+1" to path memory pmem01[0].

The branch metric calculation unit 10 calculates bm1110=λn(s11,s10) by using the past value of pmem11. The ACS10 outputs, as m10, value pm11+bm1110, which is obtained by adding a normalized path metric to a branch metric. Since only one input for this state exists, no comparison is performed. The ACS10 also outputs "−1" to path memory pmem10[0].

The branch metric calculation unit 11 calculates bm1111=λn(s11,s11) and bm0111=λ m(s01,s11) by using the past values of path memories pmem11 and pmem01. The ACS 11 compares values pm11+bm1111 and pm01+bm0111, which are obtained by adding normalized path metrics to branch metrics, to select the smaller value thereof, and then outputs the value as m11. The ACS 11 also outputs, to path memory pmem11[0], information indicating "+1" and a selected branch.

The path metric calculation unit 234 determines a minimum value among the inputs m00, m01, m10, and m11 and performs normalization using the following expressions:

$pm00=m00-min(m00, m01, m10, m11)$ $pm01=m01-min(m00, m01, m10, m11)$ $pm10=m10-min(m00, m01, m10, m11)$ $pm11=m11-min(m00, m01, m10, m11)$ Function min_start( ), which determines the minimum state, is used to output minS.

$minS=min\_start(m00, m01, m10, m11)$

In this case, as a result of function min_start( ), "00" is output when m00 is the minimum, "01" is output when m01 is the minimum, "10" is output when m10 is the minimum, and "11" is output when m11 is the minimum.

Next, based on the information selected by the ACS00, path memory pmem00 performs memory update as follows:
When bm0000 is selected, for ($i=0$; $i<pmem\_len-1$; $i++$) $pmem00[i+1]=pmem00s[i]$.

When bm1000 is selected, for ($i=0$; $i<pmem\_len-1$; $i++$) $pmem00[i+1]=pmem00[i]$.

The path memory pmem01 performs the following memory update:

for ($i=0$; $i<pmem\_len-1$; $i++$) $pmem01[i+1]=pmem10[i]$

The path memory pmem01 performs the following memory update:

for ($i=0$; $i<pmem\_len-1$; $i++$) $pmem10[i+1]=pmem11[i]$

The path memory pmem11 performs the following memory update based on the information selected by the ACS11.
When bm0111 is selected,
for ($i=0$; $i<pmem\_len-1$; $i++$) $pmem11[i+1]=pmem01[i]$.
When bm1111 is selected,
for ($i=0$; $i<pmem\_len-1$; $i++$) $pmem11[i+1]=pmem11[i]$.

Figure 13:
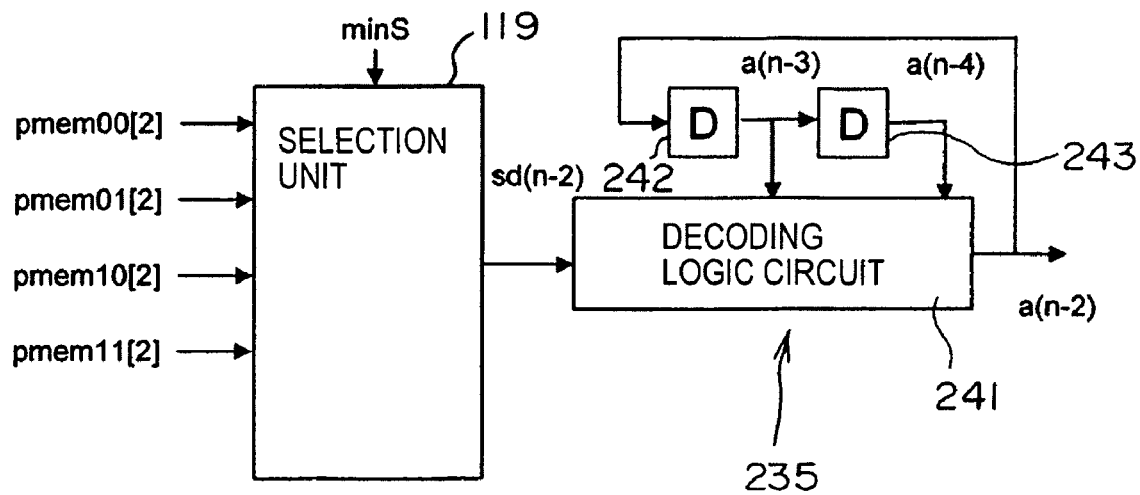
FIG. 13 is a block diagram showing details of the FDTS decoder shown in FIG. 11.

FIG. 13 shows details of the circuit of the FDTS decoder 121. As shown, the FDTS decoder 121 has a decoding logic circuit 241 and delay units 242 and 243. This is an FDTS example for τ=2.

The selection unit 119 shown in FIG. 13 is a circuit for performing the following selection using the value of minS.

$minS=00:sd(n-2)=pmem00[2]$ $minS=01:sd(n-2)=pmem01[2]$ $minS=10:sd(n-2)=pmem10[2]$ $minS=11:sd(n-2)=pmem11[2]$ Further, to comply with symbol dmin=1, the following decoding is performed using the past determination result.

$a(n-4), a(n-3)=(-1,-1):a(n-2)=sd(n-2)$ $a(n-4)a(n-3)=(-1,+1):a(n-2)=+1$ $a(n-4)a(n-3)=(+1,-1):a(n-2)=-1$ $a(n-4)a(n-3)=(-1,-1):a(n-2)=sd(n-2)$

That is, it is sufficient to make a determination such that the limitation of d is satisfied by referring to the past value of dmin+1. This is a feature of the present invention.

The FDTS delay device 122 delays a waveform to remove distortion and postcursor ISI from an output of the FBF 125. The FDTS delay device 122 is constituted by shift registers to delay y0n by the amount of FDTS decoding delay. In this case, since the FDTS decoder 121 has a decoding delay of (d0=) 3 clocks, the FDTS delay device 122 delays y0n by 3 clocks. Thus, the output of the FDTS delay device 122 is y0(n−3).

The ML delay device 117 delays a waveform to remove distortion and postcursor ISI from an output of the FBF 116. The ML delay device 117 includes shift registers to delay y0n by the amount of decoding delay of the Viterbi decoder 115. In this case, since the Viterbi decoder 115 has a decoding delay of pmem_len clocks, the ML delay device 117 delays y0n by pmem_len (=d1) clocks. That is, the output of the ML delay device 117 is y0(n−pmem_len).

The FDTS/ML selection unit 119 is a device for determining which of the decoding results of the FDTS decoder 121 and the Viterbi decoder 115 is to be used for the distortion-and-ISI removal waveform and a provisional determination result used for the LMS algorithm. When the selected provisional determination value is expressed by a(n–d) and the distortion-and-ISI removal waveform is expressed by y5(n–d), the following is given:

FDTS: $a(n-d)=a(n-d0), y5(n-d)=y50(n-d0)$

Viterbi Decoder: $a(n-d)=a(n-d1), y5(n-d)=y51(n-d1)$

Figure 14:
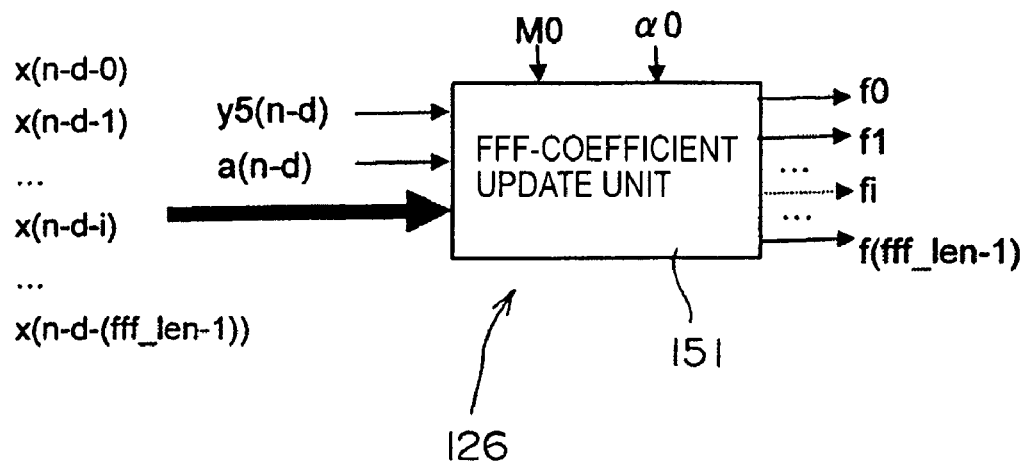
FIG. 14 is a block diagram showing the configuration of the LMS-FFF shown in FIG. 2.

Next, the operation of the LMS-FFF 126, which is an FFF LMS block, is described. FIG. 14 is a block diagram showing the configuration of the LMS-FFF 126. As shown, provisional determination result a(n–d), distortion-and-ISI removal waveform y5(n–d), and memory waveform x(n–d–i) of the FFF 113 are input to the FFF coefficient update unit 151. The coefficient update result is output to tap coefficient terminals of the FFF 113.

Next, evaluation function F(n) for a waveform output from the FFF 113 is considered using the following:

$$F(n)=\{y5_{n-d}-PR(a_{n-d})\}^2 \quad (14)$$

where n indicates current time.

PR ( ) provides a reference waveform for a desired partial response. Since this case is intended for PR(111), a(n–d)+a(n–d–1)+a(n–d–2) is calculated.

In the LMS algorithm, a filter coefficient is controlled so as to minimize a square error.

For example, when partial differentiation is performed with respect to coefficient fi for a finite-impulse-response (FIR) unit with FFF tap number i, the following is given:

$$\frac{\partial}{\partial f_i}F(n) = 2\{y5_{n-d} - PR(a_{n-d})\} \cdot x_{n-d-i} \quad (15)$$

This calculation is internally performed by the FFF coefficient update unit 151 shown in FIG. 14.

Figure 15:
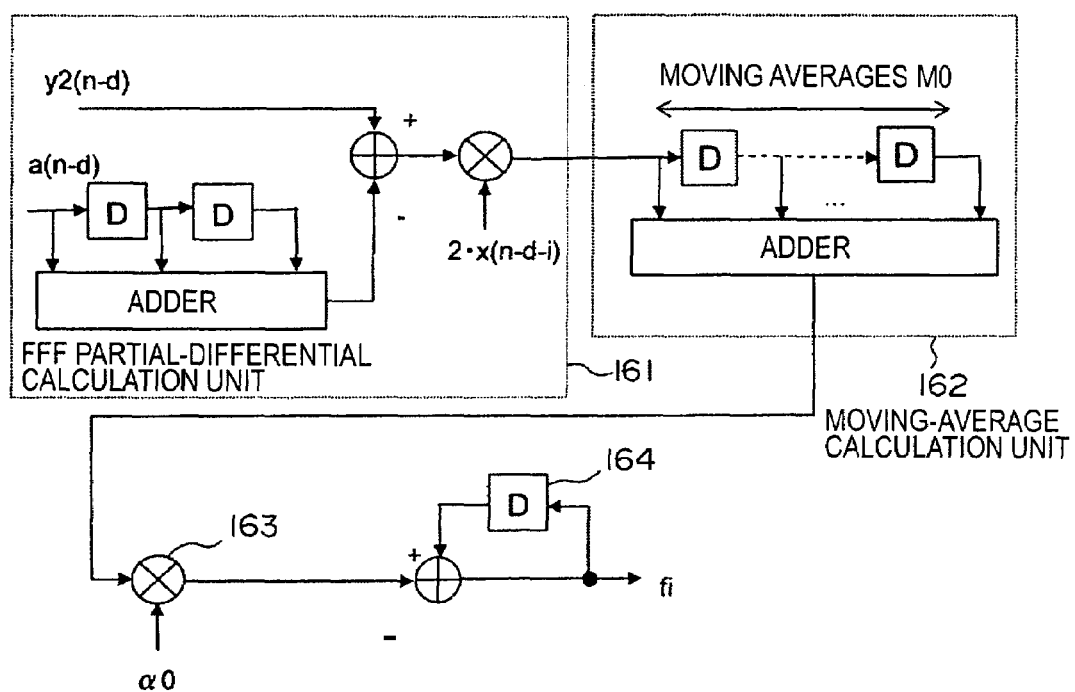
FIG. 15 is a block diagram showing details of the FFF coefficient update unit shown in FIG. 14.

FIG. 15 is a detailed block diagram illustrating the i-th tap coefficient fi for the FIR-coefficient update unit 151 shown in FIG. 14. Although FIR coefficient update units (only one of which is shown in FIG. 15) are provided such that the number thereof is equal to the number of tap coefficients fff_len, an example of the i-th tap coefficient is described since all the structures of the FIR coefficient update units are the same.

The above-noted partial differentiation is performed by an FFF partial-differential calculation unit 161, which includes adders, delay units, and so on. The result of the partial differentiation is sent to a moving-average calculation unit 162, which includes adders, delay units, and so on. The moving-average calculation unit 162 provides moving averages M0, which are used to calculate a moving average. A multiplier 163 multiples the moving average value by update coefficient α0 and a subtractor 164 subtracts the resulting value from fi obtained during the previous clock cycle, thereby performing updating.

The operation of the LMS-FBF 118, which is an LMS block for the FBF 116, is described next.

Figure 16:
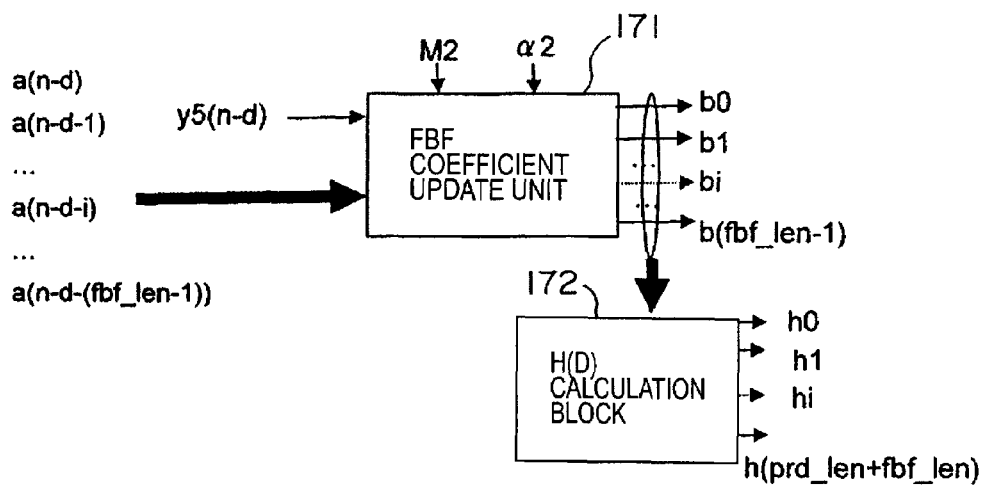
FIG. 16 is a block diagram showing the configuration of the LMS-FBF shown in FIG. 2.

FIG. 16 is a block diagram showing the internal structure of the LMS-FBF 118. As shown, the LMS-FBF 118 has an FBF coefficient update unit 171 and an H(D) calculation block 172. Distortion-and-ISI removal waveform y5(n–d) and FBF memory waveform a(n–d–i) are input to the FBF coefficient update unit 171. The result of coefficient update is output to tap-coefficient terminals of the FBF 116.

Evaluation function, F(n), for an FBF output waveform is discussed as is the case of the FFF.

For example, when partial differentiation is performed with respect to coefficient bi for tap number i of the FBF 116, the following is given.

$$\frac{\partial}{\partial b_i}F(n) = 2\{y5_{n-d} - PR(a_{n-d})\} \cdot (-a_{n-d-i}) \quad (16)$$

Figure 17:
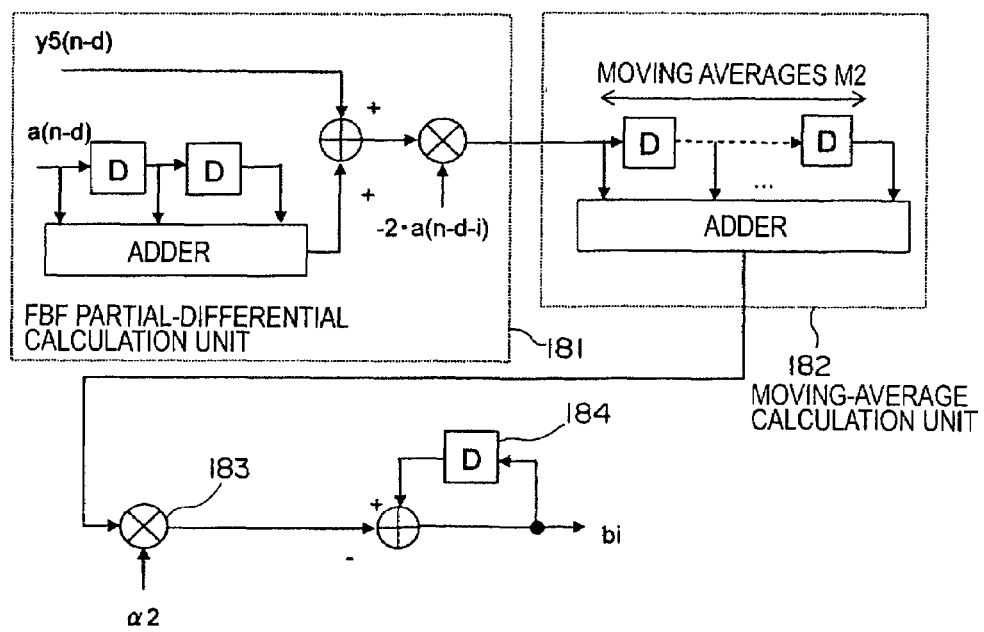
FIG. 17 is a block diagram showing details of the FFF coefficient update unit shown in FIG. 16.

FIG. 17 is a detailed block diagram illustrating the i-th tap coefficient bi for the FBF-coefficient update unit 171. Although FBF coefficient update units 171 shown in FIG. 17 (only one of which is shown) are provided such that the number thereof is equal to the number of tap coefficients, i.e., fbf_len, an example of the i-th tap coefficient is described since all the structures of the FBF coefficient update units are the same.

The above-noted partial differentiation is performed by the FBF partial-differential calculation unit 181, which includes adders, delay units, and so on. The result of the partial differentiation is sent to an FBF partial-differential calculation unit 182, which includes adders, delay units, and so on. The FBF partial-differential calculation unit 182 provides moving-averages M2, which are used to calculate a moving average. A multiplier 183 multiples the moving average value by update coefficient α2 and a subtractor 184 subtracts the resulting value from fi obtained during the previous clock cycle, thereby performing updating.

The LMS predictor 120 will be described next.

Figure 18:
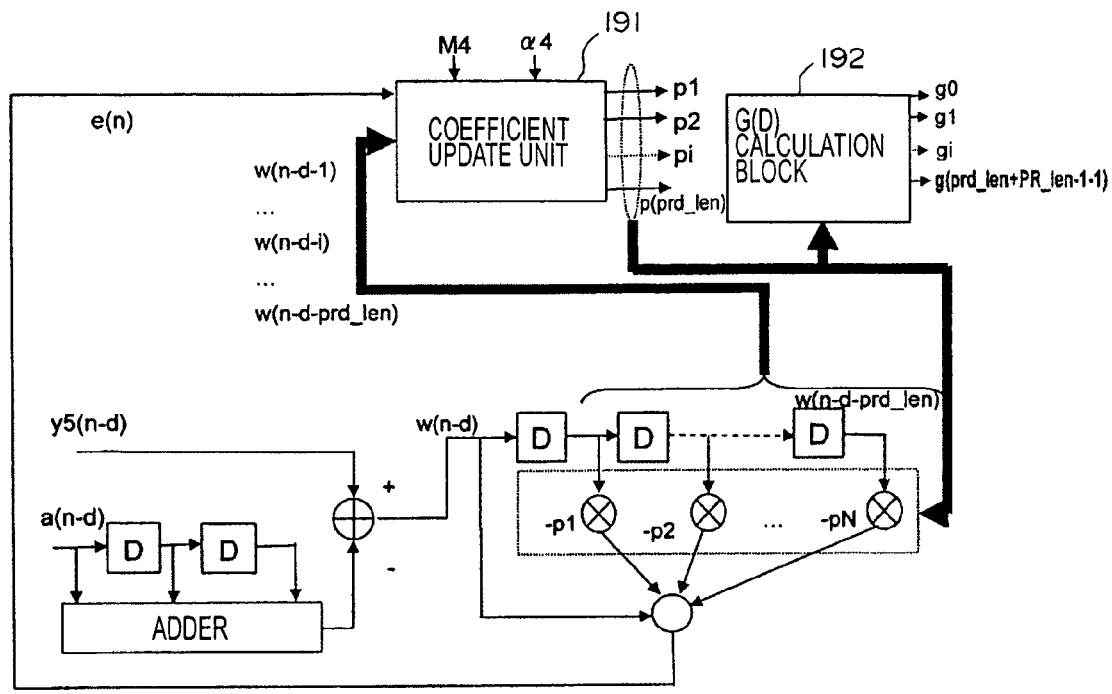
FIG. 18 is a block diagram showing the configuration of the LMS predictor shown in FIG. 2.

FIG. 18 is an internal block diagram of the LMS predictor 120.

The LMS predictor 120 has a coefficient update unit 191, a G(D) calculation block 192, and so on. Value y5(n–d) and provisional determination value a(n–d) are input to the LMS predictor 120 and an error signal w(n–d) at time n–d is calculated. This wn(n–d) is input to an FIR filter that is a noise predictor, and the result and a signal indicating w(n–d–i) are input to the coefficient update unit 191, so that each tap coefficient pi (i=1, 2, . . . , and prd_len) is updated.

Now, predictor evaluation function, $e^2(n)$, is considered as follows:

$$e^2(n) = \left\{w_{n-d} - \sum_{i=1}^{prd\_len} w_{n-d-i} \cdot p_i\right\}^2 \quad (17)$$

where n indicates current time.

Now, a method for minimizing the value by using an LMS algorithm is considered.

For example, when partial differentiation is performed with respect to coefficient pi for tap number i of the predictor, the following is given.

$$\frac{\partial}{\partial p_i}[e^2(n)] = 2\left\{w_{n-d} - \sum_{j=1}^{prd\_len} w_{n-d-j} \cdot p_j\right\} \cdot w_{n-d-i} \quad (18)$$

This calculation is internally performed by the coefficient update unit 191.

Figure 19:
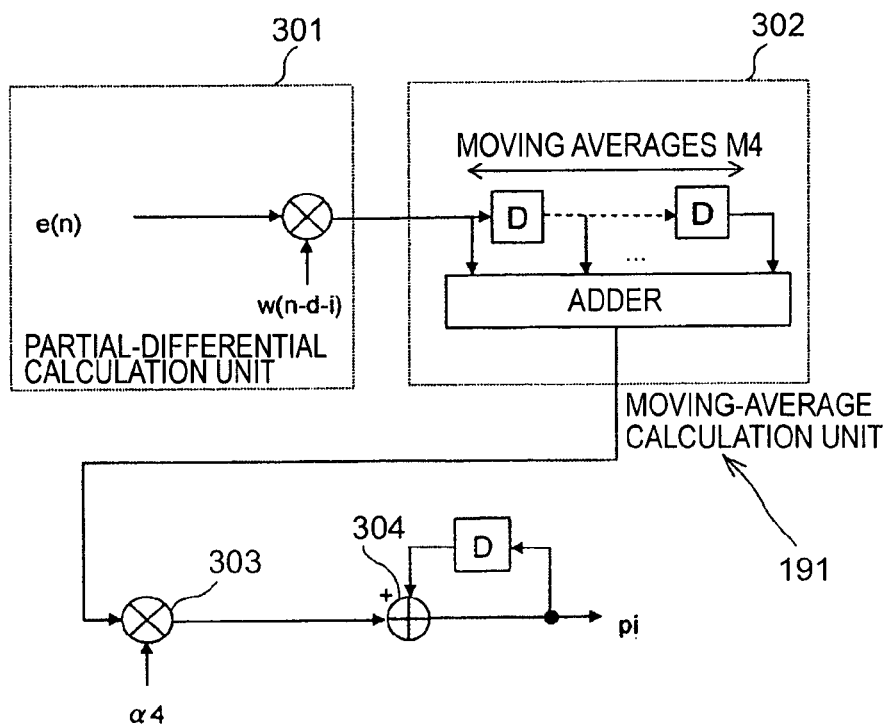
FIG. 19 is a block diagram showing details of the coefficient update unit shown in FIG. 18.

FIG. 19 is a detailed block diagram illustrating the i-th tap coefficient pi for the coefficient update unit 191. Although the coefficient update units (only one is shown in FIG. 19) are provided such that the number thereof is equal to the number of tap coefficients, i.e., prd_len, an example of the i-th tap coefficient is described since all the structures of the coefficient update units are the same.

As shown, the above-noted partial differentiation is performed by the partial-differential calculation unit 301, which includes adders, delay units, and so on. The result of the partial differentiation is sent to a moving-average calculation unit 302, which includes adders, delay units, and so on. The moving-average calculation unit 302 provides moving averages M4, which are used to calculate a moving average. A multiplier 303 multiples the moving average value by update coefficient α4 and a subtractor 164 subtracts the resulting value from pi obtained during the previous clock cycle, thereby performing updating.

Figure 20:
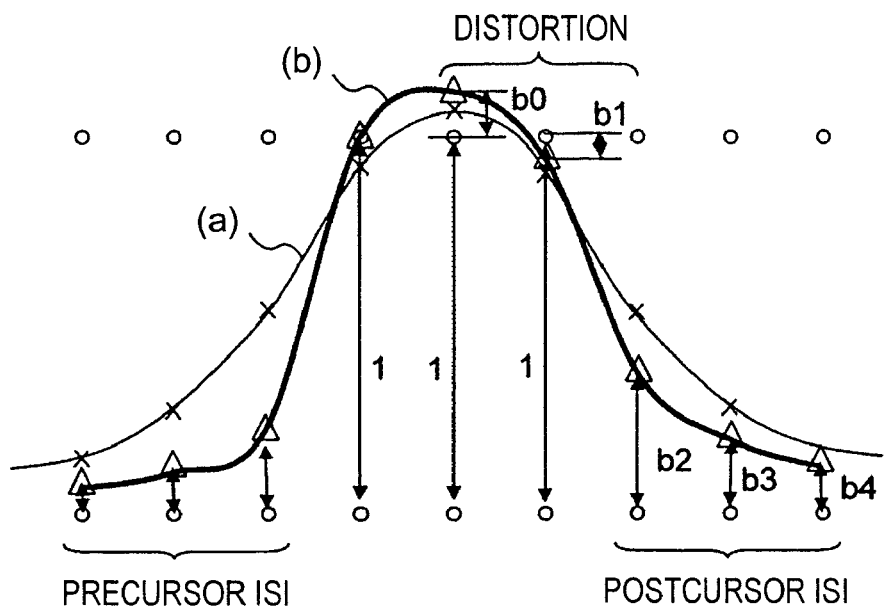
FIG. 20 is a graph showing another example of the waveform input to the FFF shown in FIG. 2.

The above description has been given for a case in which an equalization waveform lacks precursor ISI, as shown in FIG. 3. Now, a method for equalizing an equalization waveform having precursor ISI, as shown in FIG. 20, will be described.

First, an operation for, for example, rotating the phase of the equalization waveform having the precursor ISI is considered. Rotating phase θ means, when viewed along a frequency axis, multiplication of an amplitude characteristic and a phase characteristic, as shown in FIG. 20. The character, fs, represents a sampling frequency.

Figure 21:
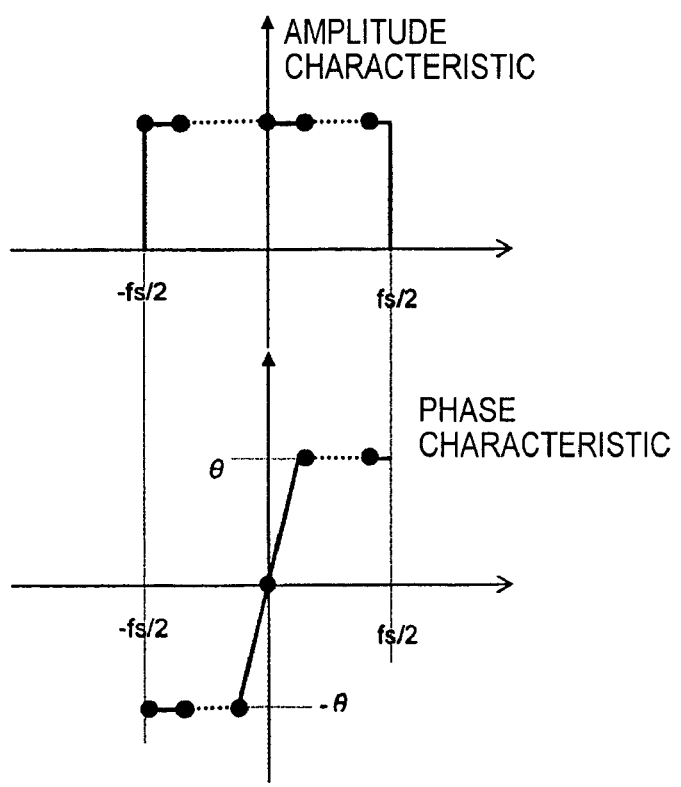
FIG. 21 illustrates a principle for rotating the phase of the equalization waveform shown in FIG. 20.

Now, an FIR having a tap coefficient obtained by performing Inverse Discrete Fourier Transform (IDFT) on the frequency characteristic shown in FIG. 21 is defined as a phase shifter. For example, when a phase shift device disclosed in Japanese Unexamined Patent Application Publication No. 2003-369312 by the present assignee is used, the phase shifter can be achieved by a simple calculation that does not require IDFT.

To determine a filter coefficient for an FIR filter, the phase shifter performs tap-coefficient calculation using a relational expression of a tap coefficient and phase rotational angle θ by applying a steady-state phase characteristic to an IDFT equation. In the tap coefficient calculation for the relational expression for determining the tap coefficient, inner product computation between a term for phase rotation angle θ and a summation term for trigonometric function k with respect to 2πkn/N (π is the circle ratio, N is a tap coefficient and is an integer equal to 1 or more, and k and n are integers defined by $0 \leq k \leq N-1$ and $0 \leq n \leq N-1$) is used, summation portion is pre-calculated for each n and is processed as a constant, and a trigonometric function for θ is determined to provide a tap coefficient through logic calculation. Since the details are disclosed in Japanese Unexamined Patent Application Publication No. 2003-369312, the description is not given herein.

Figure 22:
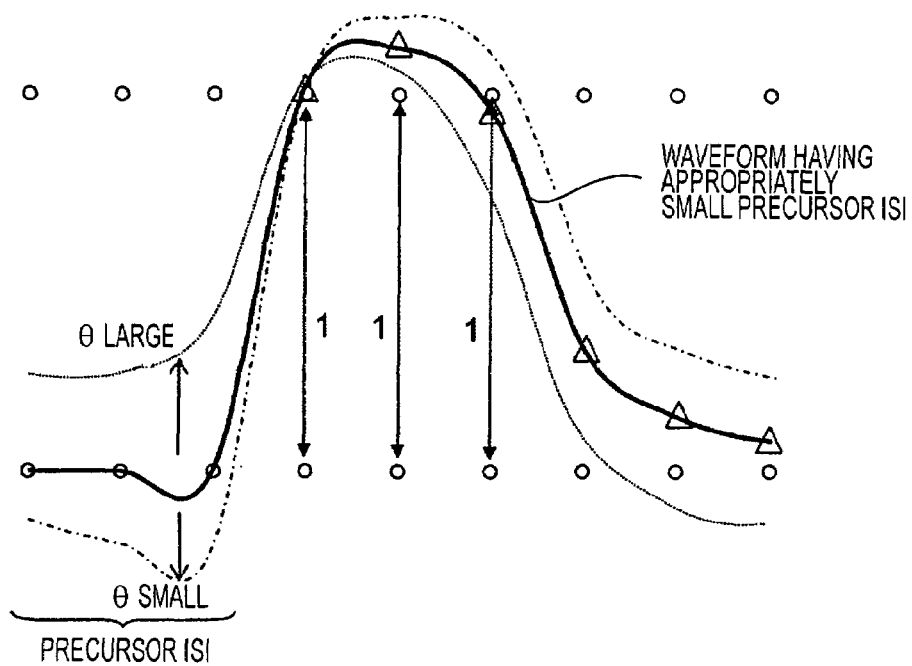
FIG. 22 is a graph showing a waveform obtained by passing the equalization waveform shown in FIG. 2 through a phase shifter.

FIG. 22 shows a waveform obtained by passing an equalization waveform through the phase shifter.

It is shown that an increase in phase θ causes overshoot in the precursor ISI to increase and a decrease in phase θ causes an increase in undershoot in the precursor ISI. Thus, applying feedback to θ with automatic control so as to reduce the precursor ISI can achieve such equalization that the precursor ISI displays an appropriately small value.

The overshoot shown in FIG. 22 appears as interference with the precursor ISI at a waveform detecting point. When θ is large, as shown in FIG. 20, error at a detecting point increases in the positive direction, and when θ is small, error at a detecting point increases in the negative direction. Thus, calculating the following expression can yield a value (i.e., the amount of phase shift) proportional to the error of θ.

$$\{y5_{n-d-1} - PR(a_{n-d-1})\} \cdot PR(a_{n-d}) \tag{19}$$

Figure 23:
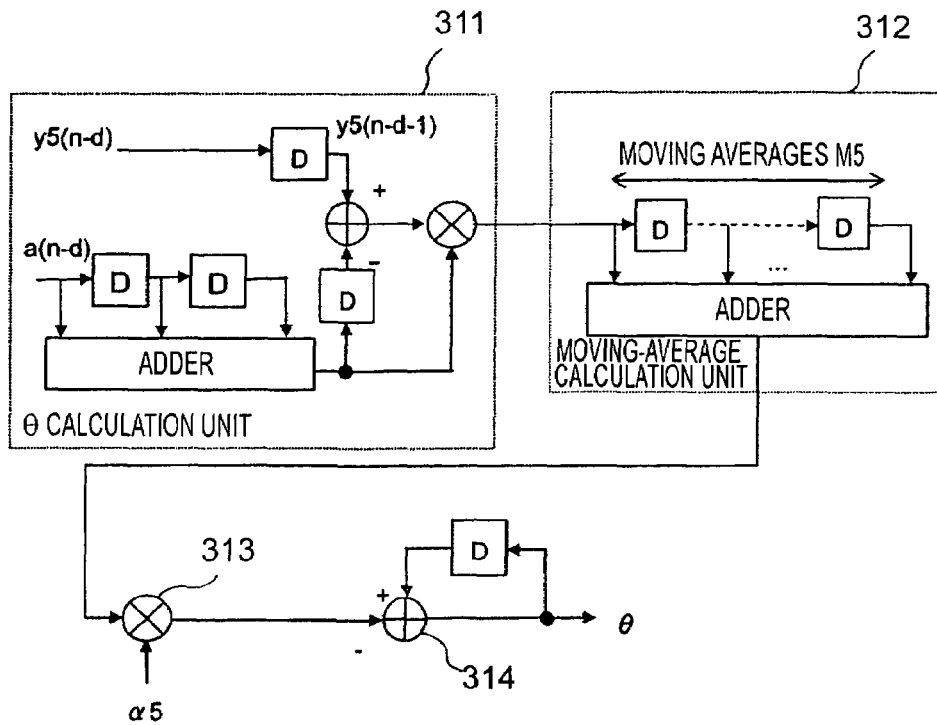
FIG. 23 is a block diagram of a phase controller for the phase shifter shown in FIG. 2.

Using this expression, a phase controller 112 updates θ. FIG. 23 shows a detailed block diagram of the phase controller 112. The phase controller 112 uses a θ calculation unit 311, which includes adders, delay units, and so on, to perform the above-noted calculation. A moving-average calculation unit 312, which includes adders, delay units, and so on, determines a moving average among M5. A multiplier 313 multiples the moving average by an update coefficient α5 and a subtractor 314 subtracts the multiplied value from θ obtained during the previous clock cycle.

Figure 24:
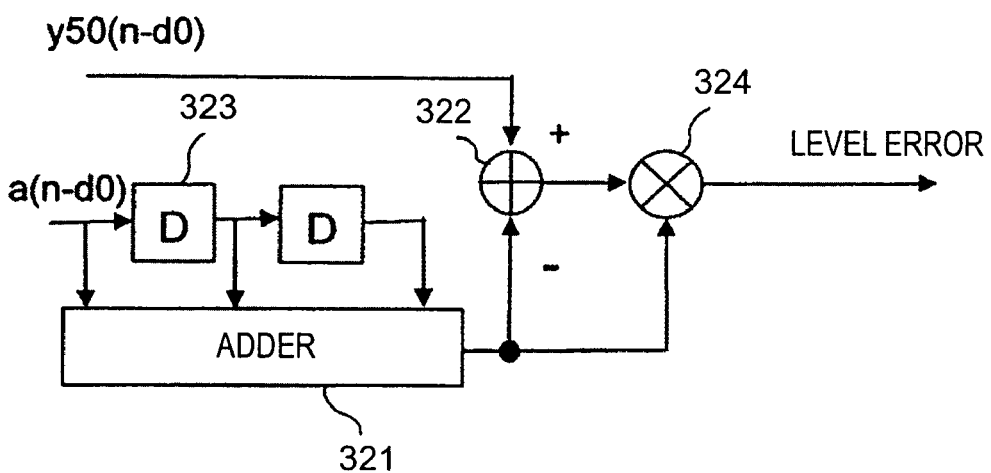
FIG. 24 is a block diagram showing the configuration of the level-error detector shown in FIG. 2.

The level-error detector 123 will be described next. FIG. 24 is a block diagram showing the configuration of the level-error detector 123. As shown, the level-error detector 123 has a configuration including adders 321, delay units 323, and a multiplier 324. The level-error detector 123 calculates a level error by using the following expression:

$$\{y50_{n-d0} - PR(a_{n-d0})\} \cdot PR(a_{n-d0}) \tag{20}$$

Figure 25:
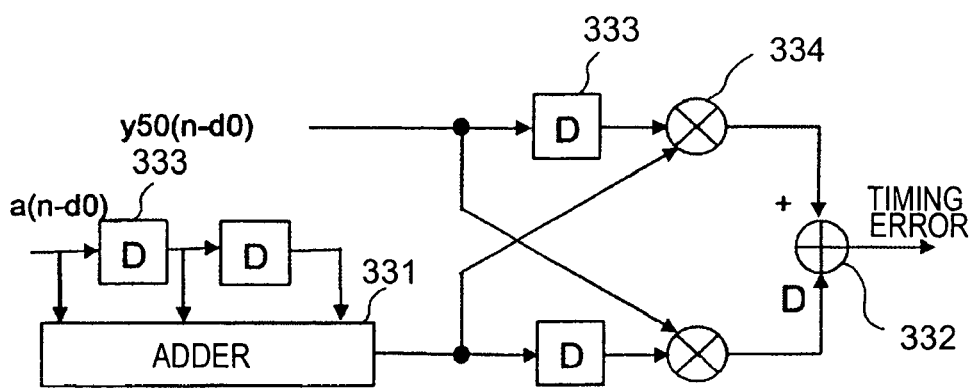
FIG. 25 is a block diagram showing the configuration of the timing-error detector shown in FIG. 2.

The timing-error detector 124 will be described next. FIG. 25 is a block diagram showing the configuration of the timing-error detector 124. As shown, the timing-error detector 124 has a configuration including adders 331 and 332, delay units 333, and multipliers 334.

The timing-error detector 124 calculates a timing error by using the following expression:

$$-y50_{n-d0} \cdot PR(a_{n-d0-1}) + y50_{n-d0-1} \cdot PR(a_{n-d0}) \tag{21}$$

The embodiment having the above configuration can minimize precursor ISI, can perform decoding with small influence of distortion and postcursor ISI while satisfying causality for a decoding system using digital-signal processing, and can improve the decoding performance of the FDTS decoder and the Viterbi decoder.

Further, a combination with the noise predictor allows for NPML decoding while removing distortion and ISI.

The use of a waveform from which distortion and ISI are removed allows for adaptive equalization using an FDTS determination result with improved determination performance and allows for more accurate detection of level error and phase error.

For example, for optical recording, tilt of a disk causes deformation of an output waveform and degradation of PLL and decoding performance. Accordingly, in order to correct such distortion, the use of the decoding method and the error detection as described in the embodiment can reduce the performance degradation.

A description will now be given of an experimental result in the presence of tangential skew of a BD (Blu-ray Disc), which is a large-capacity optical disc using blue laser light.

Figure 26:
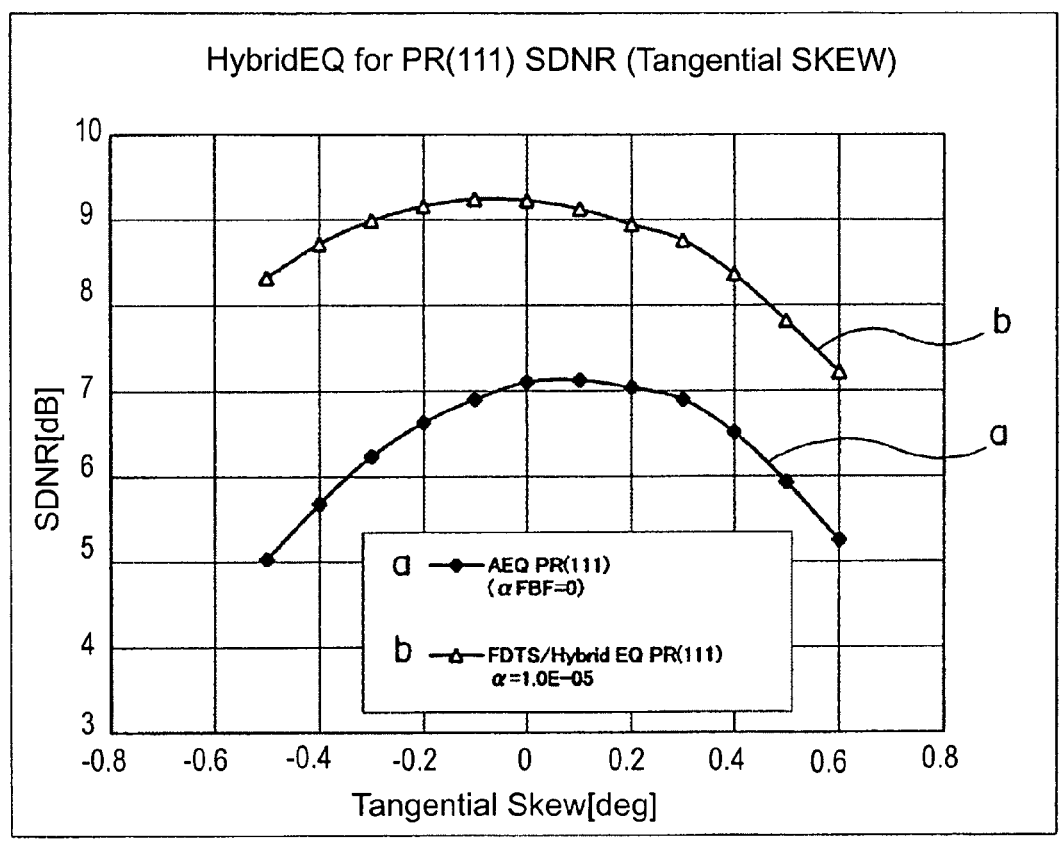
FIG. 26 is a graph showing a result of actual measurement of equalization characteristics of the device of the present embodiment shown in FIG. 2 in comparison with a known case.

FIG. 26 is a graph for SDNR (Signal to Distortion and Noise Ratio) measured at a detection point after PR equalization. The vertical axis indicates SDNR and the horizontal axis indicates tangential skew. The SDNR expresses, in dB, the rate of displacement from a detection point for PR to be equalized to an inter-detection-point level. Thus, a higher SDNR indicates higher-quality waveform equalization.

The equalization system is PR(111) and a result equalized using a known LMS algorithm is expressed by AEQ PR(111).

On the other hand, a result obtained by the method of the present embodiment is expressed by FDTS/Hybrid EQ PR(111), and it is shown that the SDNR is improved by 2 to 3 dB.

In this manner, the use of the equalization result makes it possible to detect error, such as phase error and level error, with greatly reduced influence of distortion and ISI.

Figure 27:
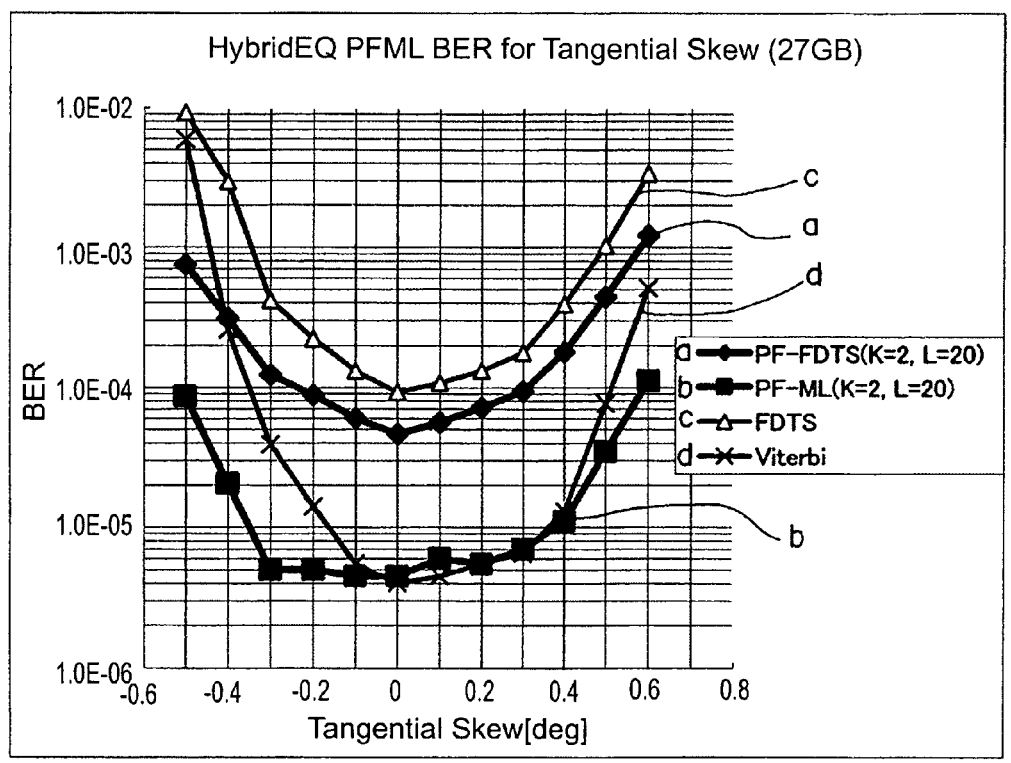
FIG. 27 is a graph showing a result of actual measurement of equalization characteristics of the device of the present embodiment shown in FIG. 2 in comparison with a known case.

FIG. 27 shows a BER (bit error rate) detected by the FDTS and Viterbi decoding. The vertical axis indicates BER and the horizontal axis indicates tangential skew. Since a low error rate indicates higher performance in this case, a lower BER indicates a higher capability of decoding.

In FIG. 27, FDTS is a result obtained by equalizing a waveform by a known method and detecting with the FDTS detector. On the other hand, PF-FDTS is a decoding result obtained by the FDTS detector of the present embodiment. Thus, it is shown that, using the decoding result, the present embodiment can improve the BER.

Viterbi indicates a result obtained by equalizing a waveform by a known method and decoding the equalization waveform by known Viterbi decoding. On the other hand, PF-ML indicates a result of the Viterbi decoding of the present embodiment. Thus, it is shown that the decoding performance is improved when the tangential skew is large.

The present embodiment, therefore, can increase a tolerance for the tilt of an optical storage disk. This can simplify adjustments during the fabrication of drives, thereby reducing the fabrication cost.

What is claimed is:

1. An adaptive equalizer comprising:
    a feedforward filter for performing response according to a partial-response scheme on only a precursor portion of inter-symbol interference of an input waveform and for performing equalization that does not consider postcursor inter-symbol interference subsequent to the precursor portion, the feedforward filter generating a first response signal;
    at least one decoder for removing at least some distortion from the first response signal, the at least one decoder generating a second response signal;
    a feedback filter for generating a response for distortion due to a partial-response of the feedforward filter and for the postcursor inter-symbol interference; and
    at least one delay circuit for delaying the first response signal after the equalization performed by the feedforward filter to provide a delayed response signal, a delay of the at least one delay circuit being associated with a delay of the at least one decoder;
    wherein the response generated by the feedback filter is subtracted from the delayed response signal from the delay circuit so that a result of the subtraction provides a partial response.

2. The adaptive equalizer according to claim 1, further comprising a least mean square block for executing a least mean square algorithm such that the feedforward filter provides an equalized waveform containing a partial response to the precursor inter-symbol interference of the waveform and distortion due to the partial response.

3. The adaptive equalizer according to claim 1, further comprising a mean square block for executing a least mean square algorithm in which a square resulting from calculation performed on a partial response determined from a provisional result obtained from a waveform output from the feedforward filter, and performed on distortion of the partial response portion of the feedforward filter and the postcursor inter-symbol interference, is partially differentiated using a tap coefficient of the feedforward filter and a result of partial differentiation is used to update a tap coefficient.

4. The adaptive equalizer according to claim 1, wherein the feedback filter generates the distortion of the waveform equalized by the feedforward filter and the postcursor inter-symbol interference, from past provisional determination data.

5. The adaptive equalizer according to claim 4, further comprising a least mean square block for executing a least mean square algorithm such that the feedback filter generates the distortion of the waveform equalized by the feedforward filter and the postcursor inter-symbol interference.

6. The adaptive equalizer according to claim 4, further comprising a mean square block for executing a least mean square algorithm in which a square resulting from calculation performed on a partial response determined from a provisional result obtained from a waveform output from the feedforward filter, and performed on distortion of the partial response portion of the feedforward filter and the postcursor inter-symbol interference, is partially differentiated using a tap coefficient of the feedback filter and a result of partial differentiation is used to update a tap coefficient.

7. The adaptive equalizer according to claim 1, further comprising a phase shifter arranged at a stage prior to the feedforward filter.

8. A partial equalization method, comprising:
    a step of performing a response according to a partial-response scheme on only a precursor portion of inter-symbol interference of an input waveform and for performing equalization that does not consider postcursor inter-symbol interference subsequent to the precursor portion to provide an equalized output signal;
    decoding the equalized output signal to remove at least some distortion and post-cursor inter-symbol distortion;
    generating a response for distortion due to the partial-response and for the postcursor inter-symbol interference;
    delaying a response after the equalization by a delay corresponding to a delay incurred during decoding; and
    subtracting the generated response from the delayed response so that a result of the subtraction provides a partial response.

* * * * *